United States Patent
Yano

(10) Patent No.: US 8,386,470 B2
(45) Date of Patent: Feb. 26, 2013

(54) INFORMATION SEARCHING METHOD, INFORMATION SEARCHING APPARATUS, INFORMATION SEARCHING SYSTEM, AND COMPUTER-READABLE INFORMATION SEARCHING PROGRAM

(75) Inventor: Takashi Yano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 549 days.

(21) Appl. No.: 11/714,246

(22) Filed: Mar. 6, 2007

(65) Prior Publication Data

US 2008/0040330 A1    Feb. 14, 2008

(30) Foreign Application Priority Data

Mar. 8, 2006  (JP) .................................. 2006-063229
Feb. 1, 2007  (JP) .................................. 2007-023431

(51) Int. Cl.
*G06F 17/30* (2006.01)
(52) U.S. Cl. .................................. 707/715; 707/999.04
(58) Field of Classification Search .................. None
See application file for complete search history.

(56) References Cited

U.S. PATENT DOCUMENTS

| | | | |
|---|---|---|---|
| 6,442,540 B2 | 8/2002 | Sako et al. | |
| 2002/0184204 A1* | 12/2002 | Sako et al. | 707/3 |
| 2004/0015537 A1* | 1/2004 | Doerksen et al. | 709/203 |
| 2004/0220919 A1* | 11/2004 | Kobayashi | 707/3 |
| 2006/0053154 A1 | 3/2006 | Yano | |
| 2008/0021878 A1 | 1/2008 | Jeong | |

FOREIGN PATENT DOCUMENTS

| | | |
|---|---|---|
| JP | 11-161682 | 6/1999 |
| JP | 2000-29906 | 1/2000 |
| JP | 2004-348773 | 12/2004 |
| JP | 2004-348774 | 12/2004 |
| JP | 2005-071382 | 3/2005 |
| JP | 2005-242401 | 9/2005 |
| JP | 2006-079366 | 3/2006 |
| WO | WO 2006/009366 A1 | 1/2006 |
| WO | WO 2006/017364 A1 | 2/2006 |

OTHER PUBLICATIONS

Garcia (Keywords Co-Occurrence and Semantic Connectivity, Milslita.com, Jun. 28, 2005).*

* cited by examiner

*Primary Examiner* — Anteneh Girma
(74) *Attorney, Agent, or Firm* — Dickstein Shapiro LLP

(57) ABSTRACT

An information searching method to be implemented in a computer includes accepting a first character string from characters or a character string in a reading or inspecting document that is displayed on a display unit, acquiring a second character string from index information for searching the reading or inspecting document, based on identification information of the reading or inspecting document, and executing a search based on the first character string and the second character string.

14 Claims, 32 Drawing Sheets

FIG.14

| | WORD A | WORD B | WORD C | WORD D | WORD E | WORD F | WORD G |
|---|---|---|---|---|---|---|---|
| | | | CO-OCCURRENCE | | | | ⌐411 |
| WORD A | | 5 | 3 | 5 | 8 | 1 | 0 |
| WORD B | 5 | | 5 | 7 | 2 | 9 | 6 |
| WORD C | 3 | 5 | | 5 | 2 | 1 | 1 |
| WORD D | 5 | 7 | 5 | | 3 | 1 | 7 |
| WORD E | 8 | 2 | 2 | 3 | | 3 | 4 |
| WORD F | 1 | 9 | 1 | 1 | 3 | | 1 |
| WORD G | 0 | 6 | 1 | 7 | 4 | 1 | |

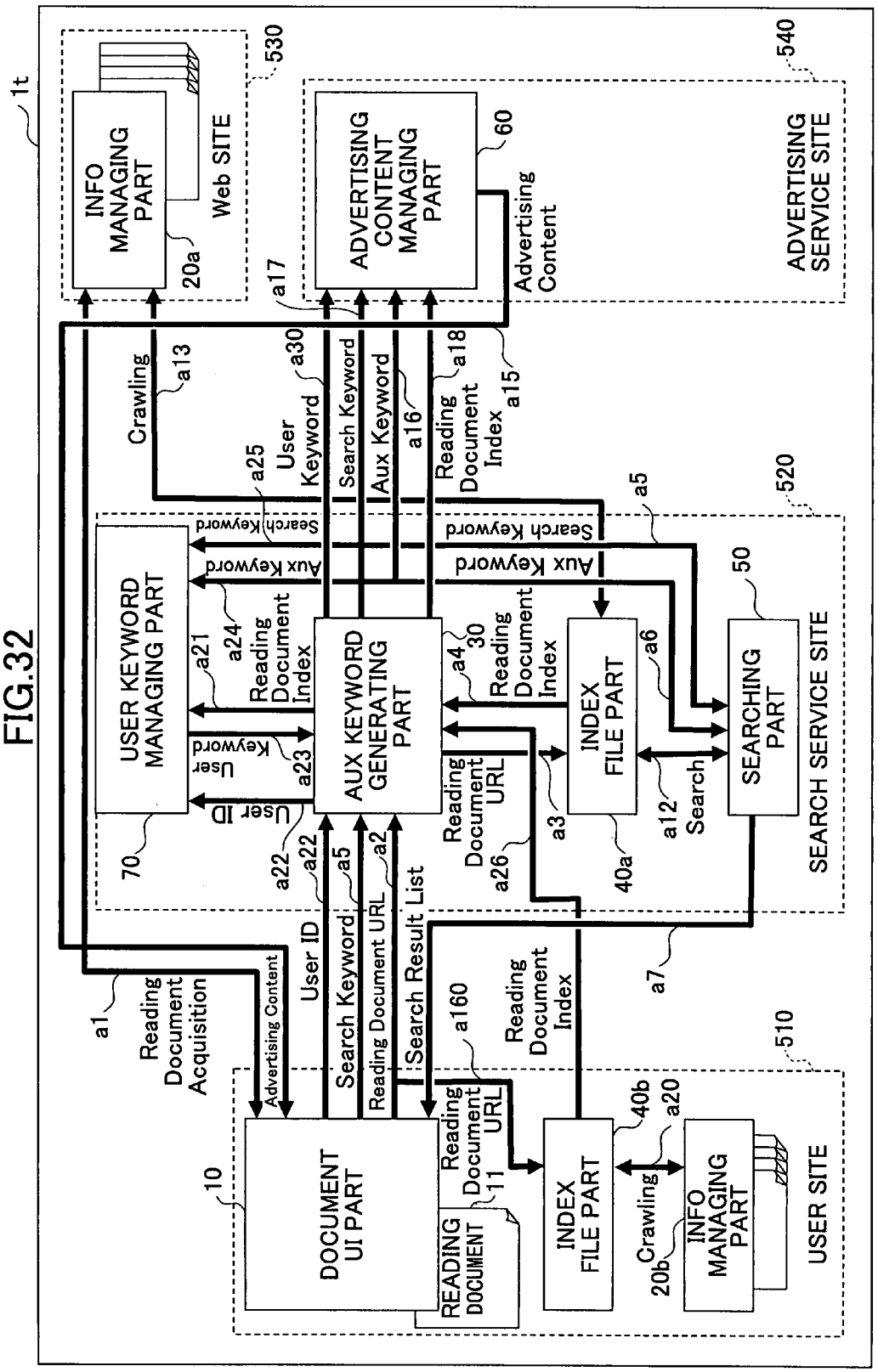

INFORMATION SEARCHING METHOD, INFORMATION SEARCHING APPARATUS, INFORMATION SEARCHING SYSTEM, AND COMPUTER-READABLE INFORMATION SEARCHING PROGRAM

BACKGROUND OF THE INVENTION

1. Field of the Invention

The present invention generally relates to information searching methods, information searching apparatuses, information searching systems and computer-readable information searching programs, and more particularly to an information searching method, an information searching apparatus, an information searching system and a computer-readable information searching program that are based on a document that is being read or inspected.

2. Description of the Related Art

Recently, various types of information are electronically stored and managed due to the developments made in the information technology. For example, documents related to business in corporations and the like are managed by a document management system or the like on an Intranet. In addition, the Internet is flooded with electronic information sent by various organizations, groups and individuals.

Accordingly, desired information can be searched quickly in a simple manner by inputting a keyword (hereinafter referred to as a search word) that is related to the desired information on a search screen provided by the document management system in the case of the information managed by the document management system or, on a search screen provided by the so-called search engine in the case of the information flooding the Internet.

There are cases where more detailed information is desired with respect to the information included in the document that is being read or inspected. In such a case, it is troublesome to input the search word by newly displaying a search screen. Of course, if the document that is being read or inspected is formed as a hypertext, such as the HTML (HyperText Markup Language) format Web page, for example, the related information can be acquired in a simple manner by tracing the link.

However, it is not always the case that the word selected by the user already has a link associated therewith. In addition, since the destination of the link is fixed in general, the amount of stored information constantly changes with time, and the notion of each word may change with lapse of time, it may be regarded that the information acquisition based on the link lacks flexibility.

For example, a Japanese Laid-Open Patent Application No. 2000-29906 proposes a technique for acquiring information related to a word that is arbitrarily selected by the user, in a simple manner, by using and transferring the word as a keyword to the search engine.

However, according to the technique proposed in the Japanese Laid-Open Patent Application No. 2000-29906, only a character string specified by the user becomes the search word. For this reason, if the character string is used for different meanings in a plurality of fields or, a plurality of words including the character string exist, there is a high possibility that the search result will include noise. Hence, there was a problem in that there are cases where a search result in accordance with the user's intentions cannot be obtained.

On the other hand, if the user is required to input a plurality of words or the like in order to improve the search accuracy, it not only deteriorates the operability, but also requires the user to make contemplative effort such as recollecting related words. As a result, such a user interface is not user-friendly and is therefore undesirable.

SUMMARY OF THE INVENTION

Accordingly, it is a general object of the present invention to provide a novel and useful information searching method, information searching apparatus, information searching system and information searching program, in which the problems described above are suppressed.

Another and more specific object of the present invention is to provide an information searching method, an information searching apparatus, an information searching system and an information searching program, which can appropriately carry out a search based on a character string related to information that is being read or inspected, by a simple operation.

Still another object of the present invention is to provide an information searching method to be implemented in a computer, comprising a selection acquiring procedure accepting a first character string from characters or a character string in a reading or inspecting document that is displayed on a display unit; an index information acquiring procedure acquiring a second character string from index information for searching the reading or inspecting document, based on identification information of the reading or inspecting document; and a search control procedure executing a search based on the first character string and the second character string.

According to the information search method of the present invention, it is possible to appropriately execute a search based on a character string that is related to the information being read or inspected, by carrying out a simple operation.

A further object of the present invention is to provide an information searching apparatus and an information searching system for executing the information searching method described above, and to provide a computer-readable information searching program and a computer-readable storage medium which stores the program for causing a computer to execute the information searching method.

Other objects and further features of the present invention will be apparent from the following detailed description when read in conjunction with the accompanying drawings.

BRIEF DESCRIPTION OF THE DRAWINGS

FIG. 14 is a diagram showing a structure of a co-occurrence management table;

FIG. 32 is a diagram showing a functional structure of the information searching system of a twentieth embodiment.

DESCRIPTION OF THE PREFERRED EMBODIMENTS

Figure 1:
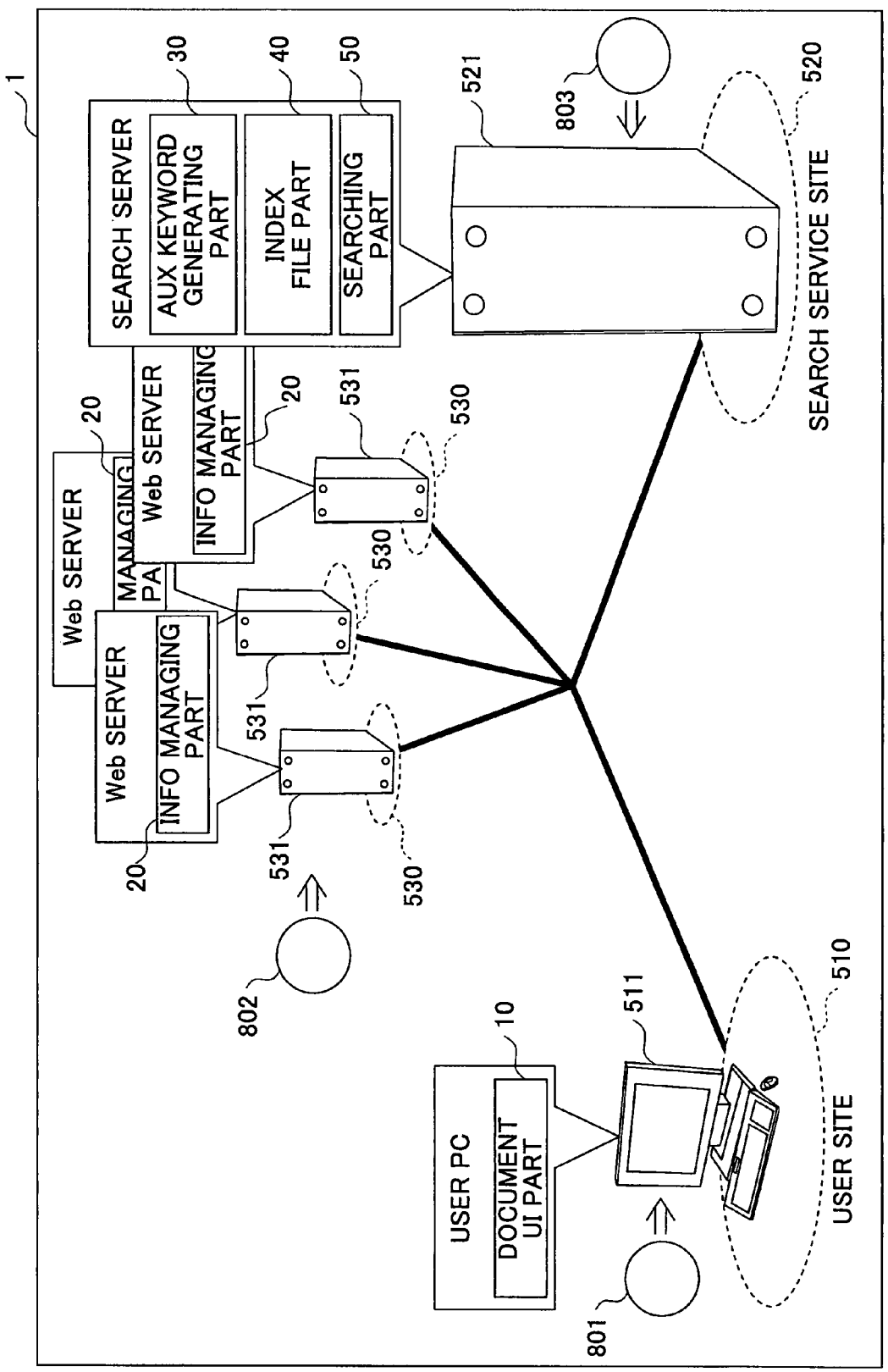
FIG. 1 is a diagram showing a network structure of an information searching system of a first embodiment.

A description will be given of embodiments of the present invention, by referring to the drawings.

FIG. 1 is a diagram showing a network structure of an information searching system of a first embodiment. In FIG. 1, an information searching system 1 is formed by a user Personal Computer (PC) 11 in a user site 510, a search server 521 in a search service site 520, and Web servers 531 in various Web sites 530 and the like. The user PC 11 includes a display unit, and an input device such as a keyboard and a mouse. These constituent elements of the information searching system 1 are connected via one or a plurality of networks, such as the Internet.

For example, the Intranet or the like in an organization to which the user belongs, corresponds to the user site 510. In addition, a Web site (search site) providing a search engine on the Internet, such as the Google (registered trademark), corresponds to the search service site 520. Further, a general Web site making information public by a Web document (Web page), corresponds to the Web site 530.

In FIG. 1, a document User Interface (UI) part 10 is implemented in the user PC 511. In addition, an information managing part 20 is implemented in each Web server 531. Moreover, an auxiliary keyword generating part 30, an index file part 40 and a searching part 50 are implemented in the search server 521. For example, each of these implemented parts is realized by installing in each computer a program that is recorded in a recording medium 801, 802 or 803 such as a CD-ROM or, a program that is downloaded via a network, and executing the program by the CPU of the computer. The functions of each of the parts will be described with reference to FIG. 2.

Figure 2:
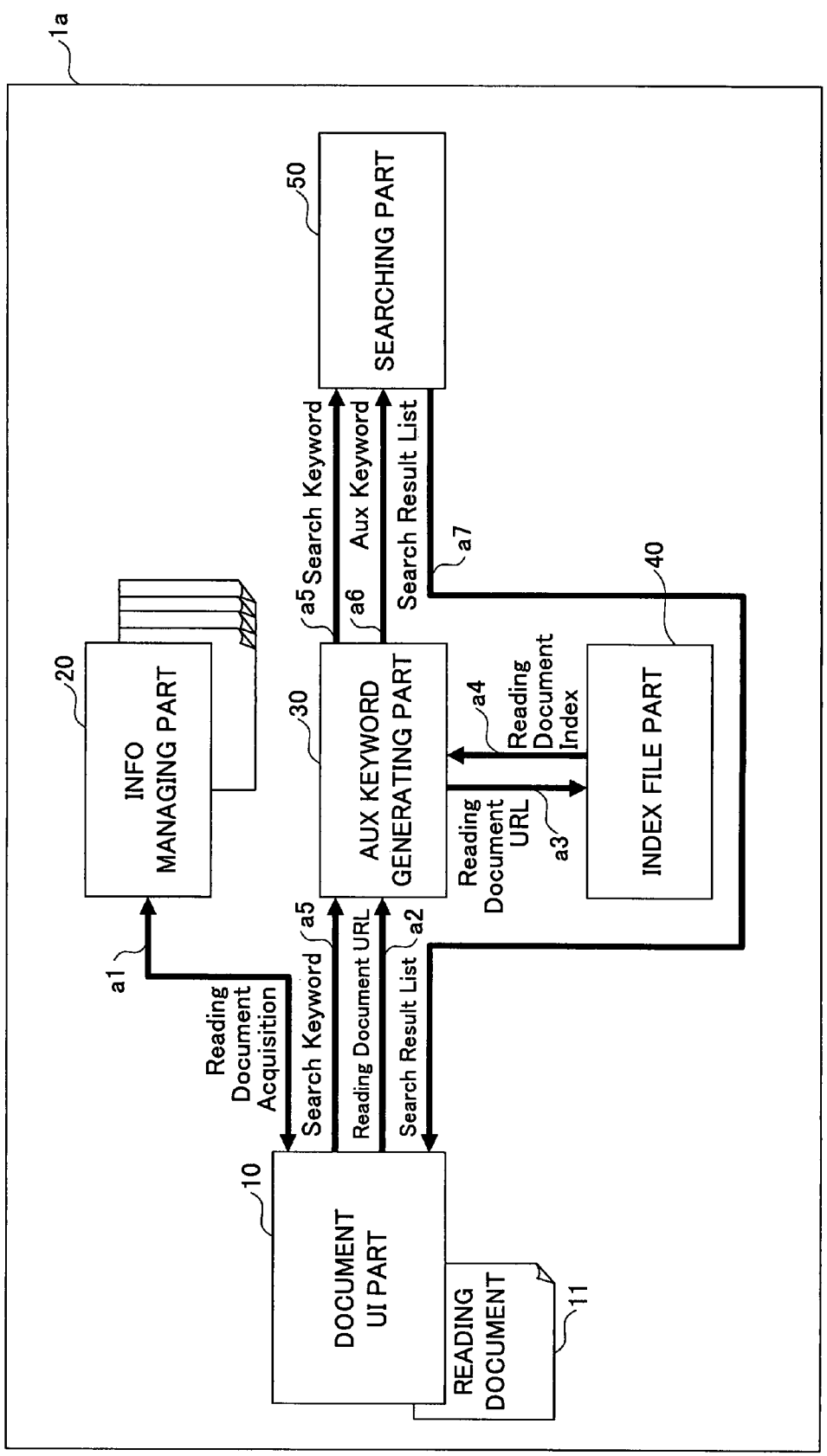
FIG. 2 is a diagram showing a functional structure of the information searching system of the first embodiment.

FIG. 2 is a diagram showing a functional structure of the information searching system of the first embodiment. An information searching system 1a shown in FIG. 2 is includes the document UI part 10, the information managing part 20, the auxiliary keyword generating part 30, the index file part 40, the searching part 50 and the like.

In the following description of FIG. 2, each symbol in brackets "( )" corresponds to an arrow designated by the same symbol in FIG. 2 and indicating the data flow.

The document UI part 10 acquires an electronic document from the information managing part 20, and displays the electronic document as a reading or inspecting document 11 (a1), and accepts an input of a search keyword from the user for executing a search based on the reading or inspecting document (hereinafter simply referred to as a reading document) 11. The input search keyword is input to the searching part 50 via the auxiliary keyword generating part 30 (a5). The search keyword may be a character string included in the reading document 11, a character string describing a feature of the reading document 11, and the like. For example, the search keyword is input via a user interface shown in FIG. 3 or FIG. 4.

Figure 3:
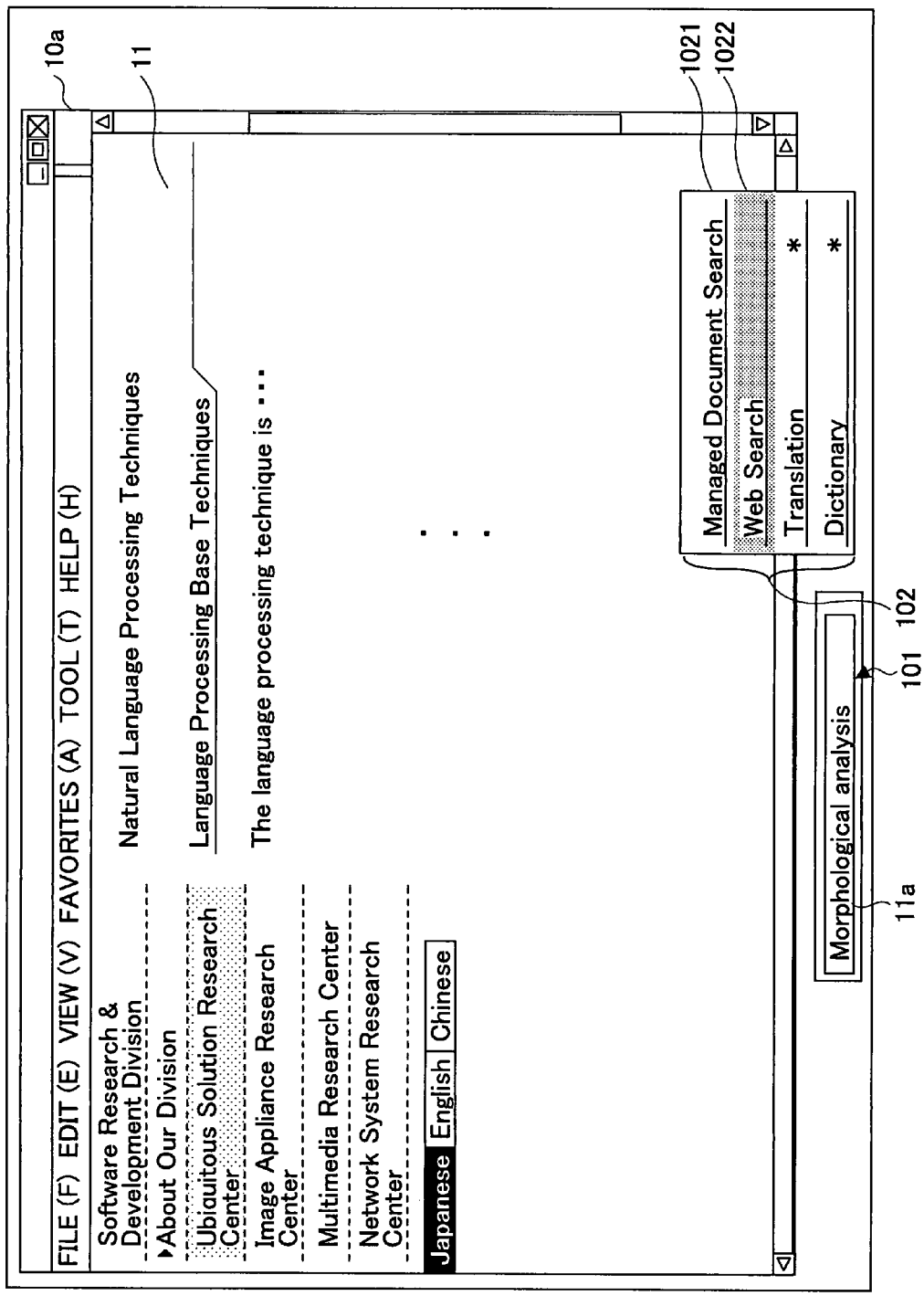
FIG. 3 is a diagram showing a manner in which a search keyword is input by an input dialog.

FIG. 3 is a diagram showing a manner in which the search keyword is input by an input dialog.

In FIG. 3, the reading document 11 is displayed on a Web browser 10a. In addition, an input dialog 101 is displayed on the Web browser 10a by the document UI part 10, as a Graphical User Interface (GUI) for inputting the search keyword. The user inputs to the input dialog 101, a search keyword 11a by a cut-and-paste from the reading document 11 or, by inputting a word describing a feature of the reading document 11 or a word included in the reading document, as the search keyword 11a, via a keyboard. Furthermore, the user displays a service menu 102 by clicking a mouse button. For example, a managed document search menu item 1021 for instructing a search with respect to a document management system on the Intranet or the like, a Web search menu item 1022 for making a search engine such as the Google (registered trademark) on the Web to execute a search, and the like are included in the service menu 102. The user selects a menu item corresponding to the desired service on the service menu 102, so as to instruct a search or the like using, as the search keyword, the character string that is input to the input dialog 101.

Figure 4:
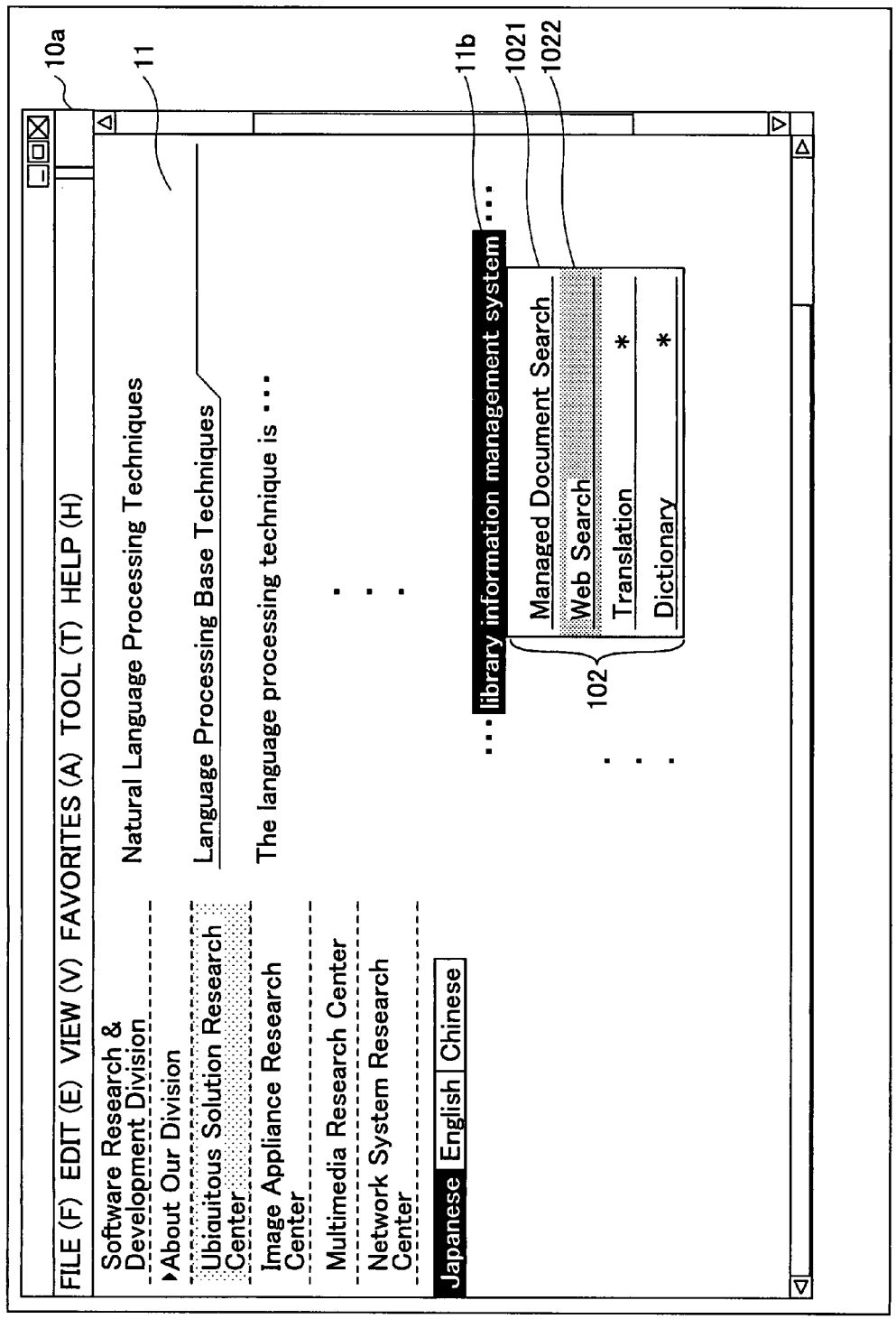
FIG. 4 is a diagram showing a manner in which a character string selected within a reading or inspecting document is regarded as the search keyword.

FIG. 4 is a diagram showing a manner in which a character string selected within the reading or inspecting document is regarded as the search keyword. In FIG. 4, those parts that are the same as those corresponding parts in FIG. 3 are designated by the same reference numerals, and a description thereof will be omitted.

In FIG. 4, a search keyword 11b is selected by a drag of a mouse cursor on the reading document 11. In addition, the user can display the service menu 102, and instruct a desired search or the like.

In FIGS. 3 and 4, the service menu 102 may be displayed at all times or, may be displayed by clicking a menu button, such as a tool bar, by the mouse. With respect to the click operation of the mouse, operations may be allocated for the right button click, the left button click, and a third button. A menu related to a search of the present invention is displayed within an existing menu in response to the right button click. A menu related to the search of the present invention or, an icon related to the menu display related to the search of the present invention, is displayed when the left button selects a word or a portion of the document, and a menu is displayed in response to the left button click of a corresponding icon. The icon may be semitransparent or, may fade out with time, for example. It is desirable that the icon does not interfere with the selection of the word or the portion of the document for purposes other than for the menu related to the search of the present invention. When a word or a portion of the document is selected by a third button click, the menu related to the search of the present invention is displayed.

For example, if the reading document 11 is a Web page, the document UI part 10 may be a Web browser or a plug-in-software with respect to the Web browser. If the reading document 11 is a document that is managed by a local document management system on the Intranet or the like, the document UI part 10 may be a dedicated or exclusive client application that is exclusively for the document management system. In a case where the document UI part 10 is realized by the plug-in-software with respect to the Web browser, a function of displaying (or a display function for) the reading document 11, strictly speaking, is covered by the Web browser.

The information managing part 20 manages a set of electronic documents within a storage unit. In the local document management system on the Intranet or the like, for example, the information managing part 20 is formed by a document management database. On the other hand, in the Internet environment, the information managing part 20 is formed by any Web site that is public on the Internet.

The auxiliary keyword generating part 30 generates a search keyword (hereinafter referred to as an auxiliary keyword) which supports or assists the search keyword. There is a high possibility that the search result will include noise if the search is carried out using only the search keyword. Hence, the searching accuracy is improved by inputting a word having a close relationship to or a high association with the search keyword to the searching part 50 as the auxiliary keyword. Using identification information (URL of the reading document 11 in this case) as the key, for example, the auxiliary keyword generating part 30 acquires index information related to or associated with the URL from the index file part 40 (a2, a3 and a4), and generates the auxiliary keyword based on the acquired index information.

The index file part 40 manages the so-called index information that is used to execute a search process at a high speed when the searching part 50 searches the electronic document or the like by the information managing part 20 or the like. For example, the index information is formed by the URL of each electronic document, the words describing the features of the electronic document, and the relationship or association with the sets of words extracted from the electronic document by a morpheme analysis or the like. In addition, the index information may include, as the word describing the feature of the electronic document, a character string that indicates a category (or field) of the electronic document.

The searching part 50 executes a search with respect to the information managing part 20 or the like, for example, based on the search keyword that is input based on the reading document 11 and is accepted by the document UI part 10, and the auxiliary keyword generated by the auxiliary keyword generating part 30, and returns a list of the search result (a search result list) to the document UI part 10 (a7). The search result list is displayed by the document UI part 10.

Figure 5:
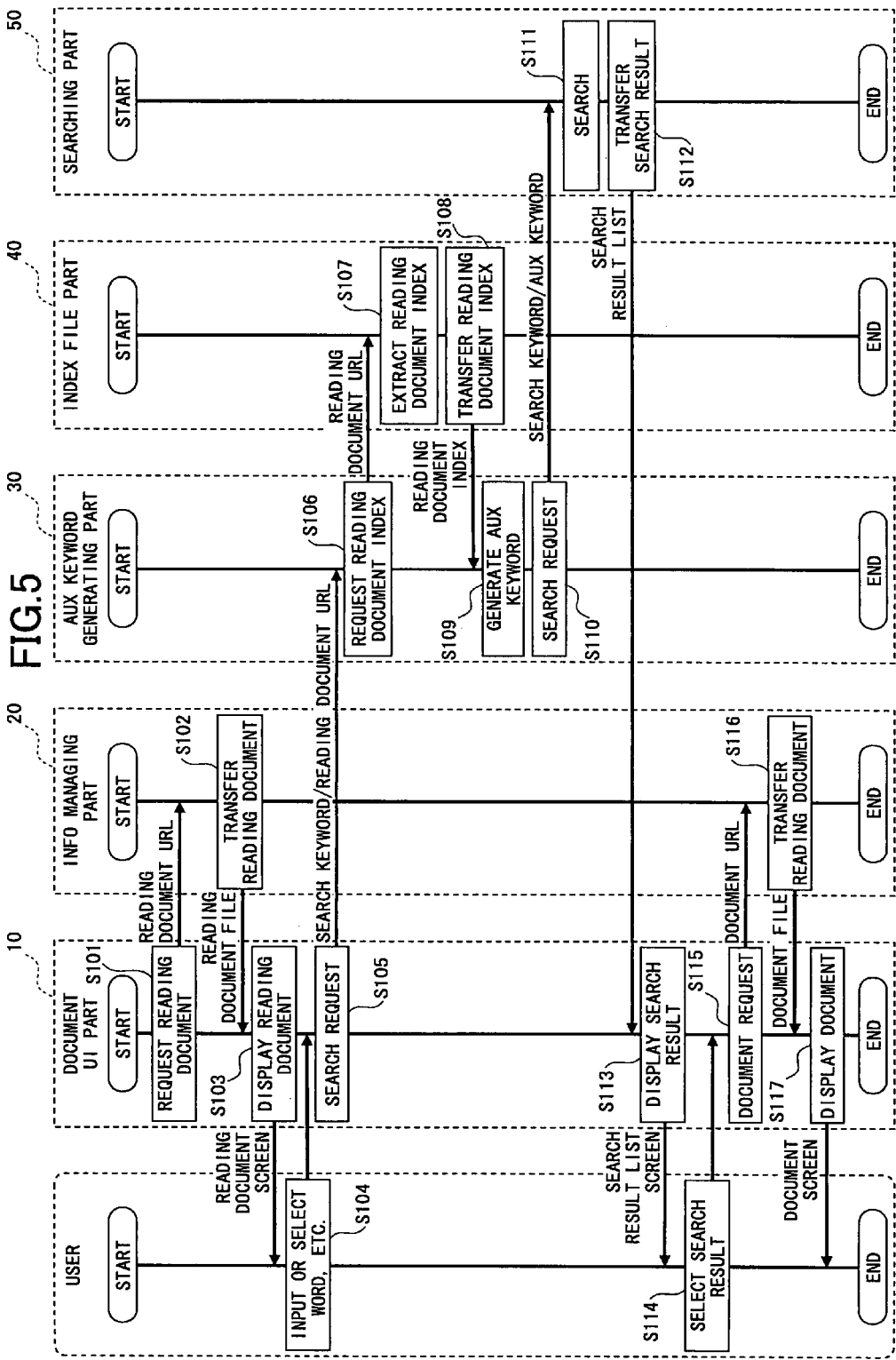
FIG. 5 is a diagram for explaining a processing procedure of the information searching system of the first embodiment.

Next, a description will be given of the processing procedure of the information searching system 1a shown in FIG. 2. FIG. 5 is a diagram for explaining the processing procedure of the information searching system of the first embodiment. In the following description, it is assumed for the sake of convenience that the document UI part 10 is implemented as a function of the Web browser.

For example, when the user inputs the URL to the Web browser or the like, the document UI part 10 requests the transfer of the reading document 11 corresponding to this URL with respect to the information managing part 20 (S101). When the information managing part 20 returns the reading document 11 (S102), the document UI part 10 displays this reading document 11 (S103).

Based on the reading document 11 displayed on the Web browser, the user inputs or selects the search keyword by carrying out the operation described above in conjunction with FIG. 3 or FIG. 4, and instructs execution of the search via the service menu 102 (S104). The document UI part 10 sends a search request with respect to the auxiliary keyword generating part 30 in response to the search instruction from the user (S105). The search request includes the search keyword that is input or selected by the user, and the URL of the reading document 11 (reading document URL).

Based on the reading document URL included in the search request, the auxiliary keyword generating part 30 requests the index information of the reading document 11 (reading document index) with respect to the index file part 40 (S106). The index file part 40 extracts the reading document index from the index information with respect to the plurality of documents being managed based on the reading document URL (S107), and transfers this reading document index to the auxiliary keyword generating part 30 (S108).

Next, the auxiliary keyword generating part 30 generates the auxiliary keyword based on the acquired reading document index (S109), and makes a search request with respect to the searching part 50 using the auxiliary keyword and the search keyword as the search words.

The searching part 50 executes a search with respect to each Web site 530 or the like, based on the search keyword and the auxiliary keyword. For example, the search based on the search keyword and the auxiliary keyword includes a search by a logical product (AND) of the search keyword and the auxiliary keyword, a search that includes at least one of the search keyword and the auxiliary keyword; and the like, and the search depends on the search engine of the searching part 50. The searching part 50 transfers a list of the search result (search result list) to the document UI part 10 (S112).

The document UI part 10 that receives the search result list displays this search result list on the Web browser (S113). For example, the display format of the search result list may be that obtained when a search is made with respect to a search engine such as the Google (registered trademark). In other words, a list of Web sites that are searched based on the search keyword and the auxiliary keyword is displayed on the Web browser.

Next, when the user selects one Web site (URL) from the search result list (S114) by clicking the mouse, for example, the document UI part 10 acquires the document corresponding to the selected URL from the information managing part 20 (S115 and S116). Then, the document UI part 10 displays the acquired document as a new reading or inspecting document (S117).

The process of the step S104 and the subsequent steps may be further executed based on the new reading or inspecting document.

Next, a more detailed description will be given of the input of the search keyword and the search instruction input process, before and after the step S104 shown in FIG. 5. First, a description will be given of the processing procedure for the case (case shown in FIG. 3) where the search keyword is input via the input dialog 101.

Figure 6:
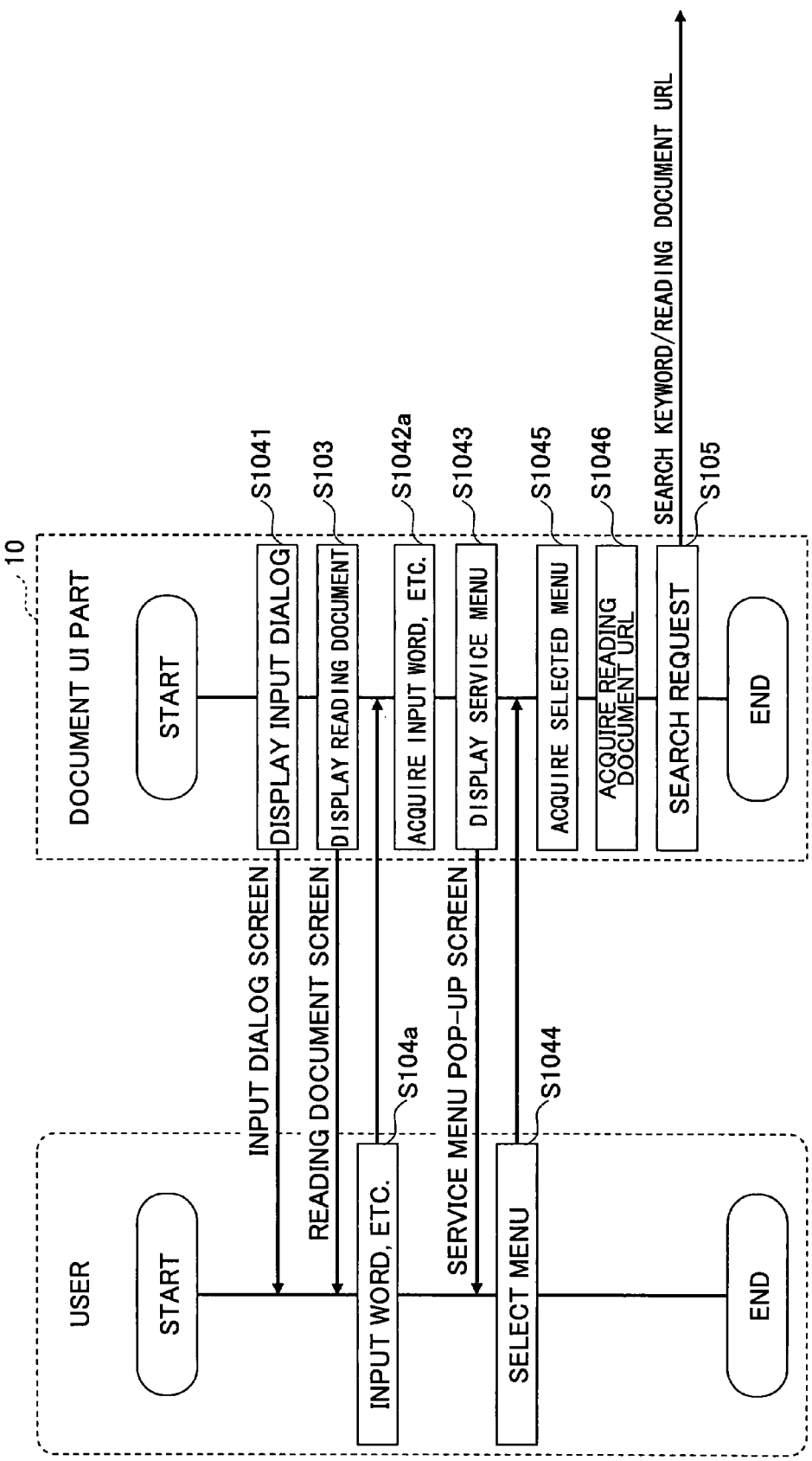
FIG. 6 is a diagram for explaining in detail the search keyword input process via the input dialog.

FIG. 6 is a diagram for explaining in detail the search keyword input process via the input dialog.

In FIG. 6, those steps that are the same as those corresponding steps in FIG. 5 are designated by the same reference numerals.

The document UI part 10 displays the input dialog 101 (S1041), and acquires the reading document 11 from the information managing part 20 and displays this reading document 11 (S103). When the user inputs a character string with respect to the input dialog 101 (S104a), the document UI part 10 acquires the input character string as the search keyword (S1042a), and displays the service menu 102 by a pop-up display (S1043).

When the user selects from the service menu 102 a menu item (for example, "Web search") corresponding to the desired service (S1044), the document UI part 10 recognizes the selected menu item (S1045), acquires the URL of the reading document 11 (reading document URL) from the Web browser 10a (S1046), and transfers the search keyword and the reading document URL to the auxiliary keyword generating part 30 so as to make a search request (S105).

Next, a description will be given of the processing procedure for the case (case shown in FIG. 4) where the search keyword is selected by the mouse cursor.

Figure 7:
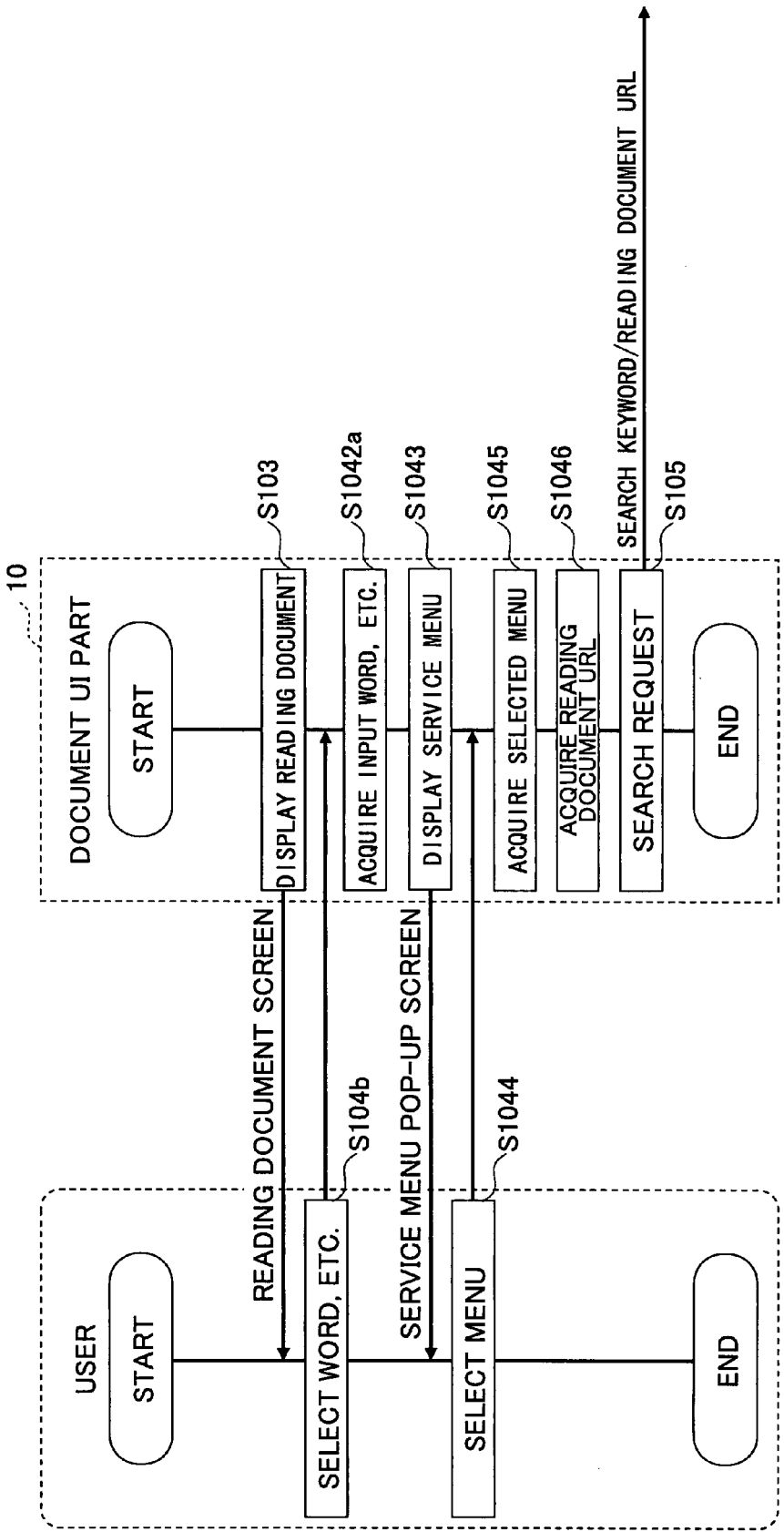
FIG. 7 is a diagram for explaining in detail the search keyword input process of the selection made by the mouse cursor.

FIG. 7 is a diagram for explaining in detail the search keyword input process of the selection made by the mouse cursor. In FIG. 7, those steps that are the same as those corresponding steps in FIGS. 5 and 6 are designated by the same reference numerals.

The document UI part 10 acquires the reading document 11 from the information managing part 20 and displays the reading document 11 (S103). When the user selects a character string on the reading document 11 by the mouse cursor (S104b), the document UI part 10 acquires the selected character string as the search keyword (S1042b), and displays the service menu 102 by a pop-up display (S1043).

When the user selects from the service menu 102 a menu item (for example, "Web search") corresponding to the desired service (S1044), the document UI part 10 recognizes the selected menu item (S1045), acquires the URL of the reading document 11 (reading document URL) from the Web browser 10a (S1046), and transfers the search keyword and the reading document URL to the auxiliary keyword generating part 30 so as to make a search request (S105).

Figure 8:
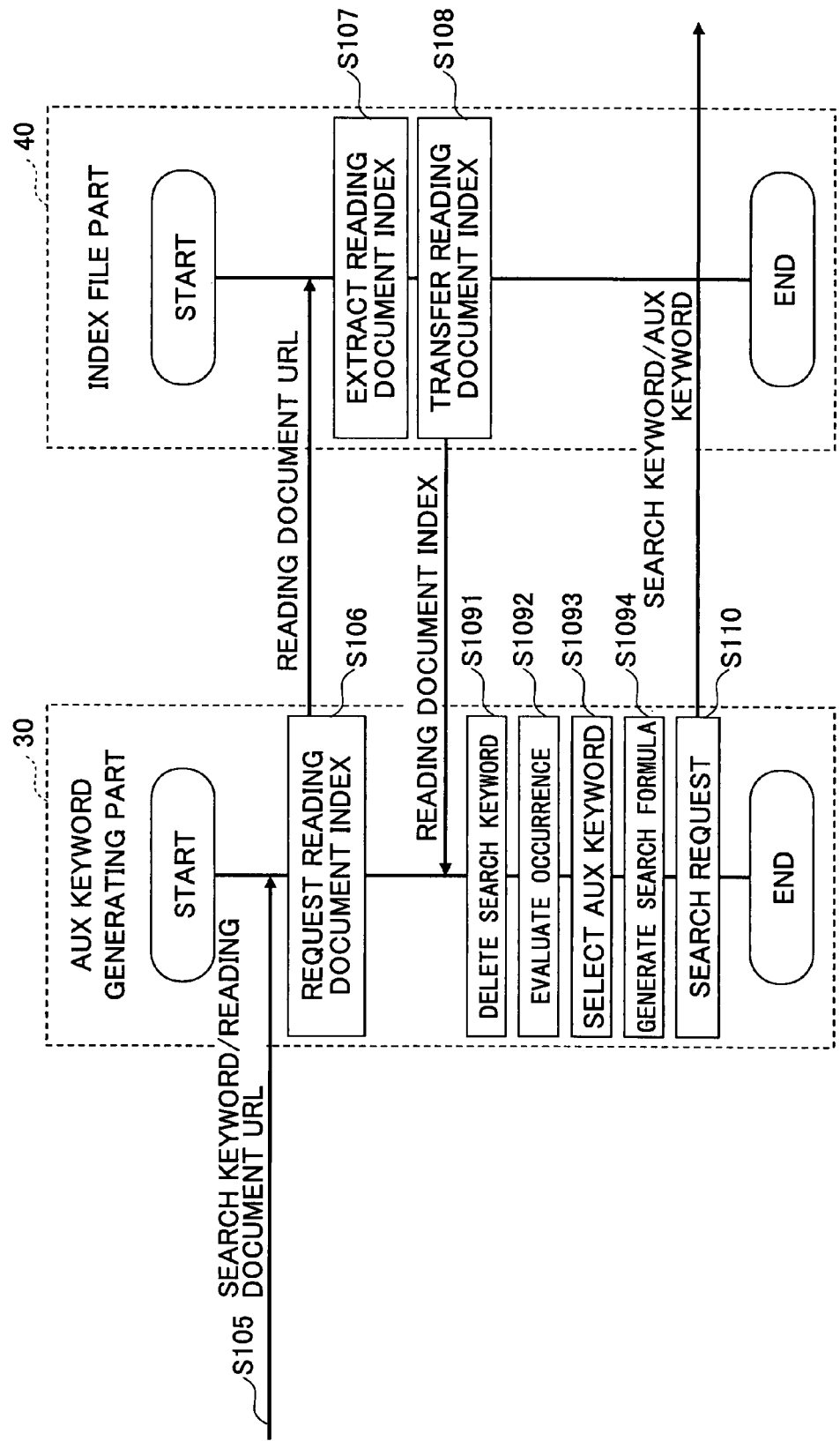
FIG. 8 is a diagram for explaining in detail the auxiliary keyword generating process of the first embodiment.

Next, a more detailed description will be given of the auxiliary keyword generating process of the auxiliary keyword generating part 30 in the step S109 shown in FIG. 5. FIG. 8 is a diagram for explaining in detail the auxiliary keyword generating process of the first embodiment. In FIG. 8, those steps that are the same as those corresponding steps in FIG. 5 are designated by the same reference numerals.

The auxiliary keyword generating part 30 requests the index information of the reading document 11 (reading document index) with respect to the index file part 40 (S106) based on the reading document URL that is included in the search request (S105). The index file part 40 extracts the reading document index from the index information with respect to the plurality of documents being managed based on the reading document URL (S107), and transfers the reading document index to the auxiliary keyword generating part 30 (S108).

Next, the auxiliary keyword generating part 30 deletes from the reading document index the index information that overlaps with the search keyword (S1091), and extracts the auxiliary keyword by narrowing the candidates according to an evaluation based on the occurrence (or relative frequency) or the like (S1092 and S1093). Then, the auxiliary keyword generating part 30 generates a search formula from the search keyword and the auxiliary keyword (S1094), and transfers the search request based on this search formula to the searching part 50 (S110).

As described above, according to the information searching system 1a of the first embodiment, it is possible to execute a search which adds the auxiliary keyword to the search keyword, without requiring the user to input the auxiliary keyword. Accordingly, it is possible to increase the possibility of obtaining a search result that is in accordance with the user's intentions without requiring the user to perform complex or troublesome operations. In addition, the auxiliary keyword is generated based on the index information that is generated in advance and managed. The index information is normally formed as a set of words describing the feature of each document. Hence, it is possible to output a search result having a close relationship to or a high association with the reading document with a high processing efficiency, based on the search keyword that is input or selected. For example, if the auxiliary keyword includes a character string that describes the category (or field) of the reading document, it is possible to obtain by the search a document in the same category (or field) as the reading document or, in a category (or field) similar to that of the reading document. It is possible to use all of the words included in the index information as the auxiliary keyword, but the index information normally includes a large number of words. For this reason, it is preferable to narrow the candidates by the evaluation based on the occurrence or the like, as in the case of this embodiment.

Figure 9:
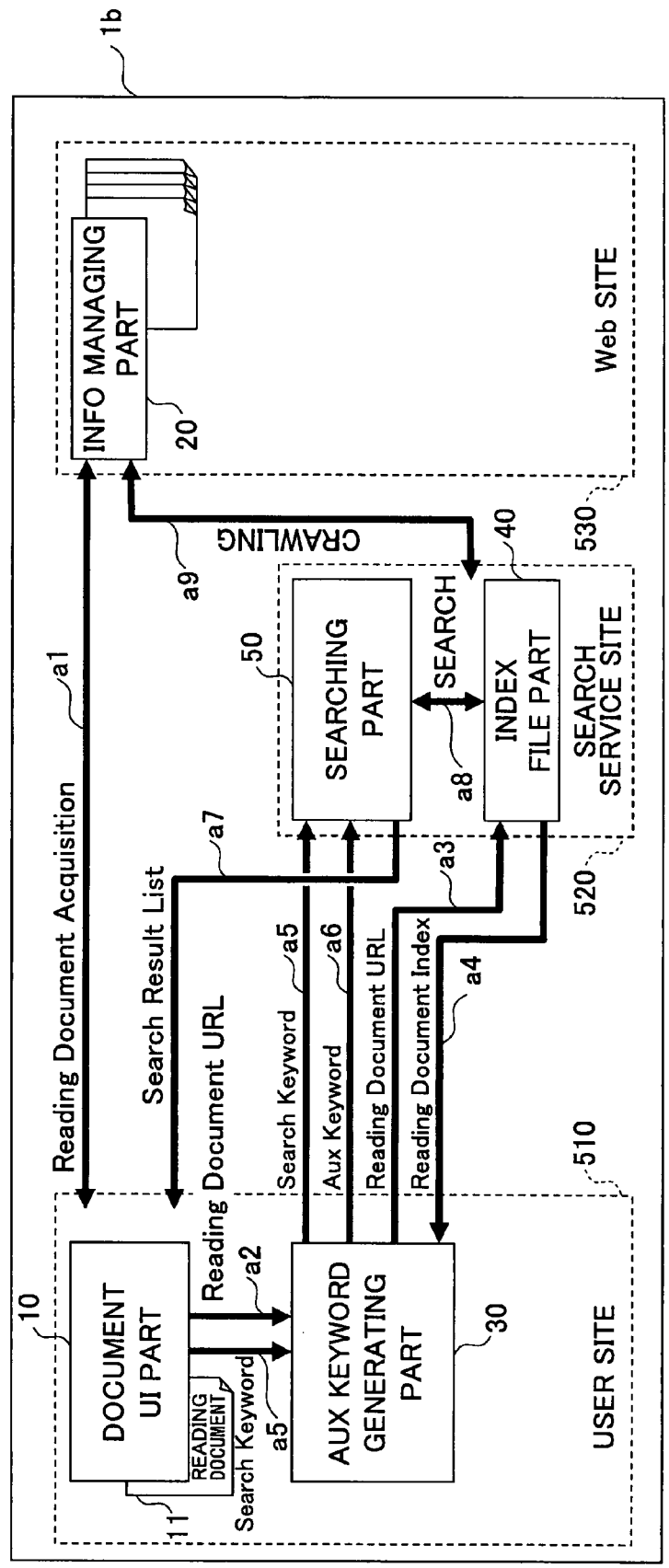
FIG. 9 is a diagram showing a functional structure of the information searching system of a second embodiment.

Next, a description will be given of a second embodiment. FIG. 9 is a diagram showing a functional structure of the information searching system of the second embodiment. In FIG. 9, those parts that are the same as those corresponding parts in FIG. 2 are designated by the same reference numerals, and a description thereof will be omitted.

In the second embodiment, the site of each of the parts forming the information searching system 1a of the first embodiment is definitely specified.

In an information searching system 1b shown in FIG. 9, the document UI part 10 and the auxiliary keyword generating part 30 are implemented in a user site 510. In addition, the searching part 50 and the index file part 40 are implemented in a search service site 520. Furthermore, the information managing part 20 is provided on a Web site 530. In other words, in the second embodiment, the information managing part 20 corresponds to any Web site that is the search target of the search service site 520.

In the information searching system 1b shown in FIG. 9, the auxiliary keyword generating part 30 is set up on the Intranet of the user site 510 or on the PC of the individual user, and acquires the reading document index from the index file part 40 which is set up in the search service site 520 and manages the index information of the Web documents of each Web site (a4). In addition, the auxiliary keyword generating part 30 generates the auxiliary keyword based on the acquired reading document index.

The search formula based on the search keyword that is input via the document UI part 10 and the auxiliary keyword that is generated by the auxiliary keyword generating part 30 is input to the searching part 50 in the search service site 520 (A5 and a6). Based on the search keyword and the auxiliary keyword, the searching part 50 executes a search using the index information of the index file part 40 (a8). For example, the Web page including the search keyword and the auxiliary keyword is searched by the search process (a9). For example, the search result is returned to the document UI part 10 in a format similar to that of the search result from the general search engine (a7).

Figure 10:
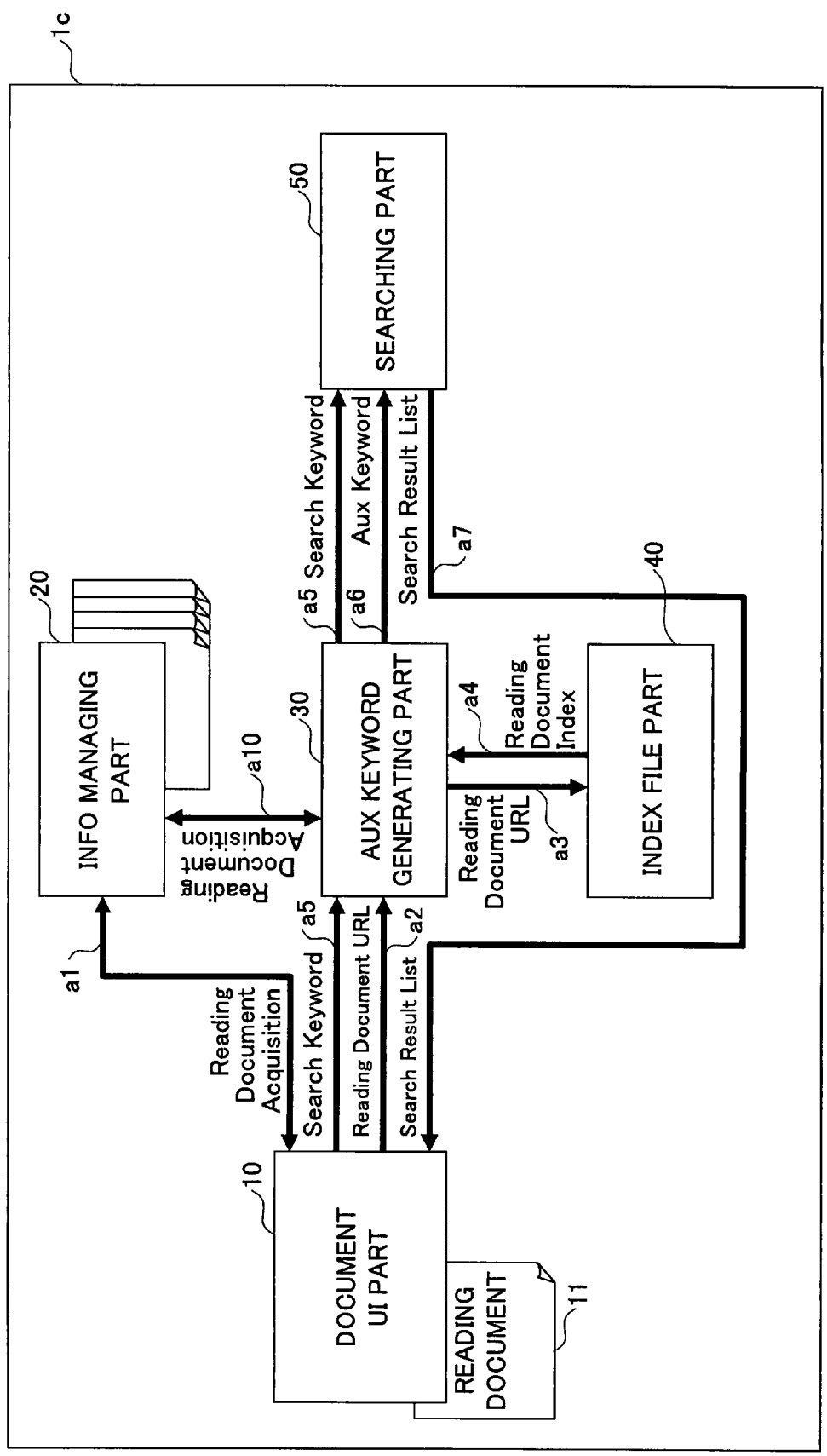
FIG. 10 is a diagram showing a functional structure of the information searching system of a third embodiment.

Next, a description will be given of a third embodiment, which is a modification of the first embodiment. FIG. 10 is a diagram showing a functional structure of the information searching system of the third embodiment. In FIG. 10, those parts that are the same as those corresponding parts in FIG. 2 are designated by the same reference numerals, and a description thereof will be omitted.

In an information searching system 1c shown in FIG. 10, the auxiliary keyword generating part 30 acquires a document identical to the reading document 11 that is displayed by the document UI part 10 when generating the auxiliary keyword (a10). The auxiliary keyword generating part 30 acquires the reading document 11 for the following reasons. The auxiliary keyword generating part 30 of the third embodiment extracts, from the reading document index acquired by the index file part 40 (a4), as the auxiliary keyword, the word that is included in the same unit as the search keyword when the reading document 11 is segmented into predetermined units, the word having a physical distance (number of lines, number of characters or the like) that is relatively close to the search keyword in the reading document 11, and the like. Accordingly, the auxiliary keyword generating part 30 acquires the reading document 11 because of the need to refer to the reading document 11 in order to measure the predetermined unit or the physical distance from the search keyword.

For example, for the HTML document, the segmenting unit of the reading document may be a minimum unit with which the document can be specified by identification information such as the URL of the hyperlink within one HTML document (for example, the value of the href attribute of the <a> tag). In addition, the segmenting unit of the reading document may be page units for a document of a word processing software or the like, and slide units for a document of a spreadsheet software such as the PowerPoint (registered trademark).

Figure 11:
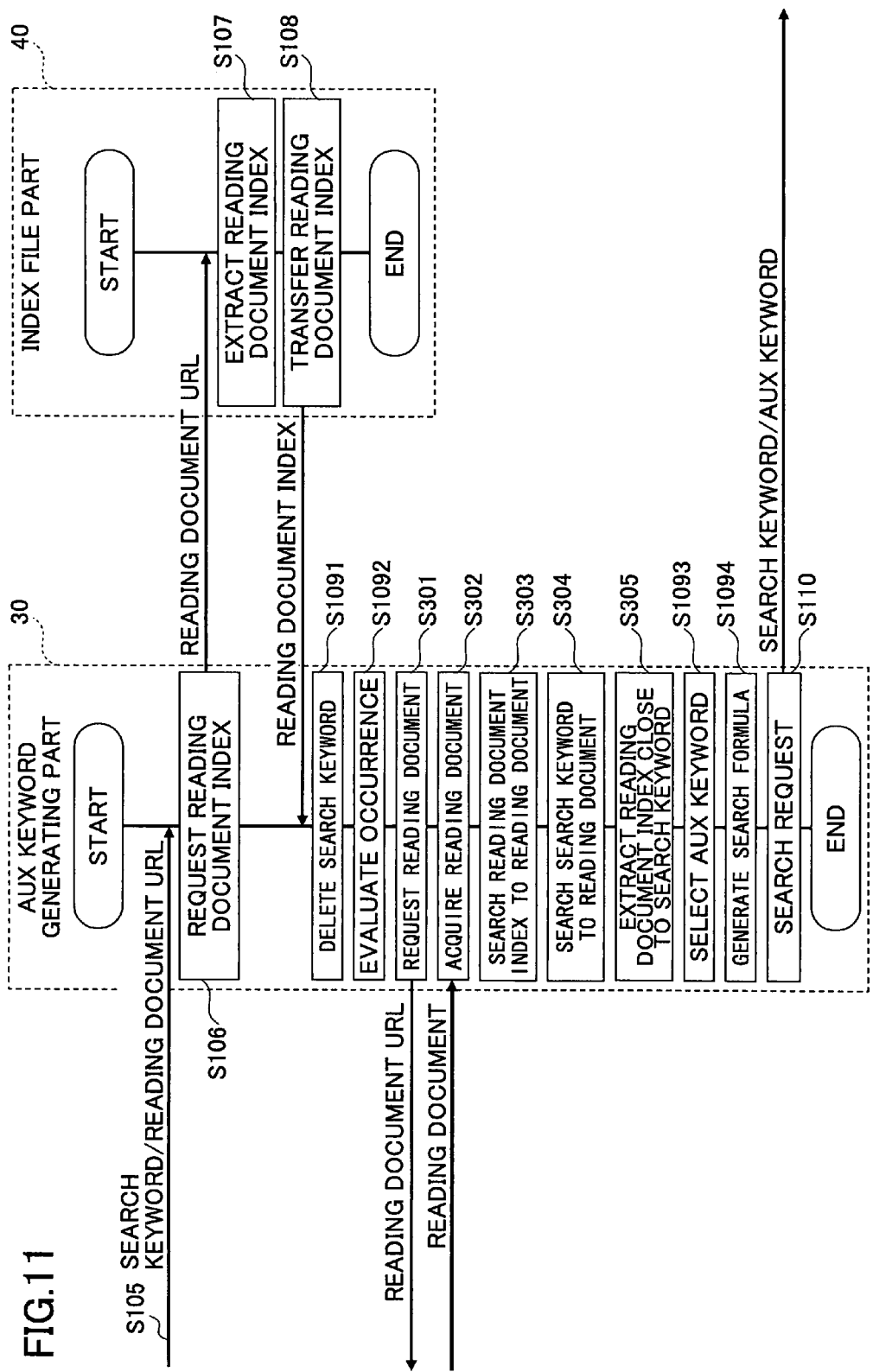
FIG. 11 is a diagram for explaining in detail the auxiliary keyword generating process of the third embodiment.

Next, a description will be given of the auxiliary keyword generating process of the auxiliary keyword generating part 30 of the information searching system 1c shown in FIG. 10. FIG. 11 is a diagram for explaining in detail the auxiliary keyword generating process of the third embodiment. In FIG. 11, those steps that are the same as those corresponding steps in FIG. 8 are designated by the same reference numerals, and a description thereof will be omitted.

In FIG. 11, steps S301 through S305 are newly added between the steps S1092 and S1093.

In other words, when the auxiliary keyword generating part 30 extracts the auxiliary keyword from the reading document index by narrowing the candidates by the evaluation based on the occurrence or the like (S1092), the auxiliary keyword generating part 30 acquires (searches) the reading document 11 by the information managing part 20 (S301 and S302). Then, the auxiliary keyword generating part 30 searches from the reading document 11 the words that are included in the reading document index, so as to understand or recognize the position (line number or the like) of each of these words within the reading document 11 (S303). Next, the auxiliary keyword generating part 30 searches the search keyword from the reading document 11, so as to understand or recognize the position of the search keyword within the reading document 11 (S304). Then, the auxiliary keyword generating part 30 extracts from the words included in the reading document index the words (for example, the top ten words) having the physical distance that is relatively close to the search keyword or, the words included in the same unit as the search keyword when the reading document 11 is segmented into predetermined units, based on the information understood or recognized in the steps S303 and S304 (S305). The auxiliary keyword generating part 30 regards the extracted word as the auxiliary keyword (S1093). The process carried out thereafter is as described above in conjunction with FIG. 8.

As described above, according to the information searching system 1c of the third embodiment, the reading document index having the physical distance that is relatively close to the search keyword is selected from the reading document 11 as the auxiliary keyword. The physical distance between two words may be regarded as having, to a certain extent, a correlation to the degree or intensity with which the meanings of the two words are related. Accordingly, it is possible to execute the search based on the auxiliary keyword having a closer relationship to or a higher association with the search keyword.

Figure 12:
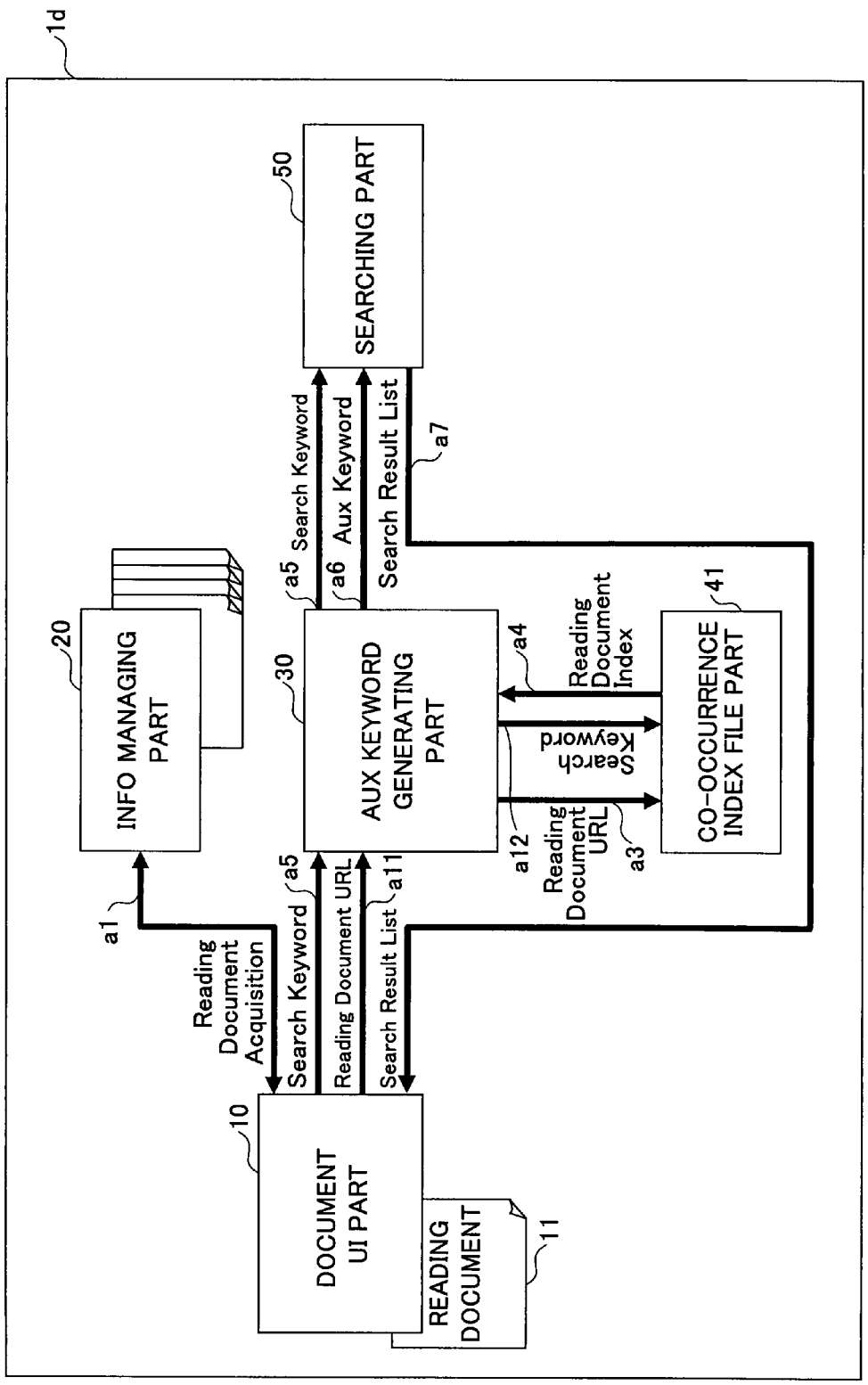
FIG. 12 is a diagram showing a functional structure of the information searching system of a fourth embodiment.

Next, a description will be given of a fourth embodiment, which is a modification of the first embodiment. FIG. 12 is a diagram showing a functional structure of the information searching system of the fourth embodiment. In FIG. 12, those parts that are the same as those corresponding parts in FIG. 2 are designated by the same reference numerals, and a description thereof will be omitted.

In an information searching system 1d shown in FIG. 12, a co-occurrence index file part 41 is provided as a constituent element in place of the index file part 40. The co-occurrence index file 41 corresponds to the index file part 40 added with a function of managing the co-occurrence. In other words, the co-occurrence index file part 41 outputs, as the reading document index (a4), the word having a relatively high co-occurrence with the search keyword in the index information of the reading document 11, based on the reading document URL (a3) and the search keyword (a12) input by the auxiliary keyword generating part 30.

Figure 13:
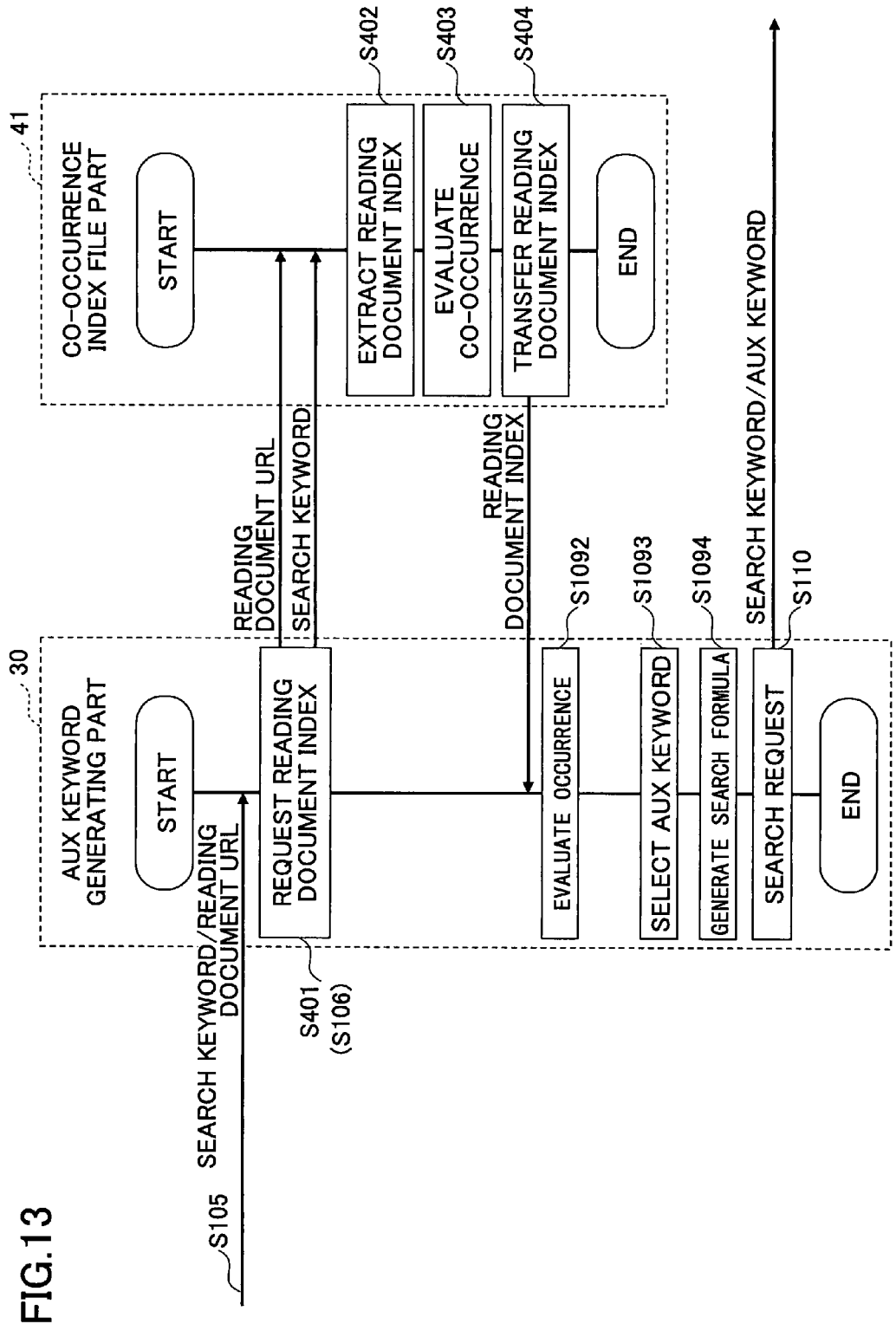
FIG. 13 is a diagram for explaining in detail the auxiliary keyword generating process of the fourth embodiment.

Next, a description will be given of the auxiliary keyword generating process of the auxiliary keyword generating part 30 of the information searching system 1d shown in FIG. 12. FIG. 13 is a diagram for explaining in detail the auxiliary keyword generating process of the fourth embodiment. In FIG. 13, those steps that are the same as those corresponding steps in FIG. 8 are designated by the same reference numerals, and a description thereof will be omitted.

In FIG. 13, steps S401 through S404 are newly added between the steps S105 and S1092. The step S401 replaces the step S106.

In other words, the auxiliary keyword generating part 30 requests the index information of the reading document 11 (reading document index) with respect to the co-occurrence index file part 41, together with the reading document URL and the search keyword included in the search request (S401).

The co-occurrence index file part 41 extracts the index information of the reading document 11 from the index information with respect to a plurality of documents being managed, based on the reading document URL (S402). Further, the co-occurrence index file part 41 extracts from the index information the words having a relatively high co-occurrence with the search keyword (S403). The evaluation of the co-occurrence with the search keyword may be made based on the table described below that is managed by the co-occurrence index file part 41.

FIG. 14 is a diagram showing a structure of a co-occurrence management table. A co-occurrence management table 411 shown in FIG. 14 manages the co-occurrence for each combination of the words. For example, the co-occurrence management table 411 may be generated with respect to the words included in the index information, for every index information of each document.

When the co-occurrence index file part 41 transfers, as the reading document index, the set of words extracted as having the relatively high co-occurrence with the search keyword to the auxiliary keyword generating part 30 (S404), the auxiliary keyword generating part 30 executes the process of the step S1093 and the subsequent steps using the reading document index as the auxiliary keyword.

As described above, according to the information searching system 1d of the fourth embodiment, the word having the high co-occurrence with the search keyword is selected as the auxiliary keyword. For this reason, it is possible to execute the search based on the auxiliary keyword having a closer relationship to or a higher association with the search keyword.

Figure 15:
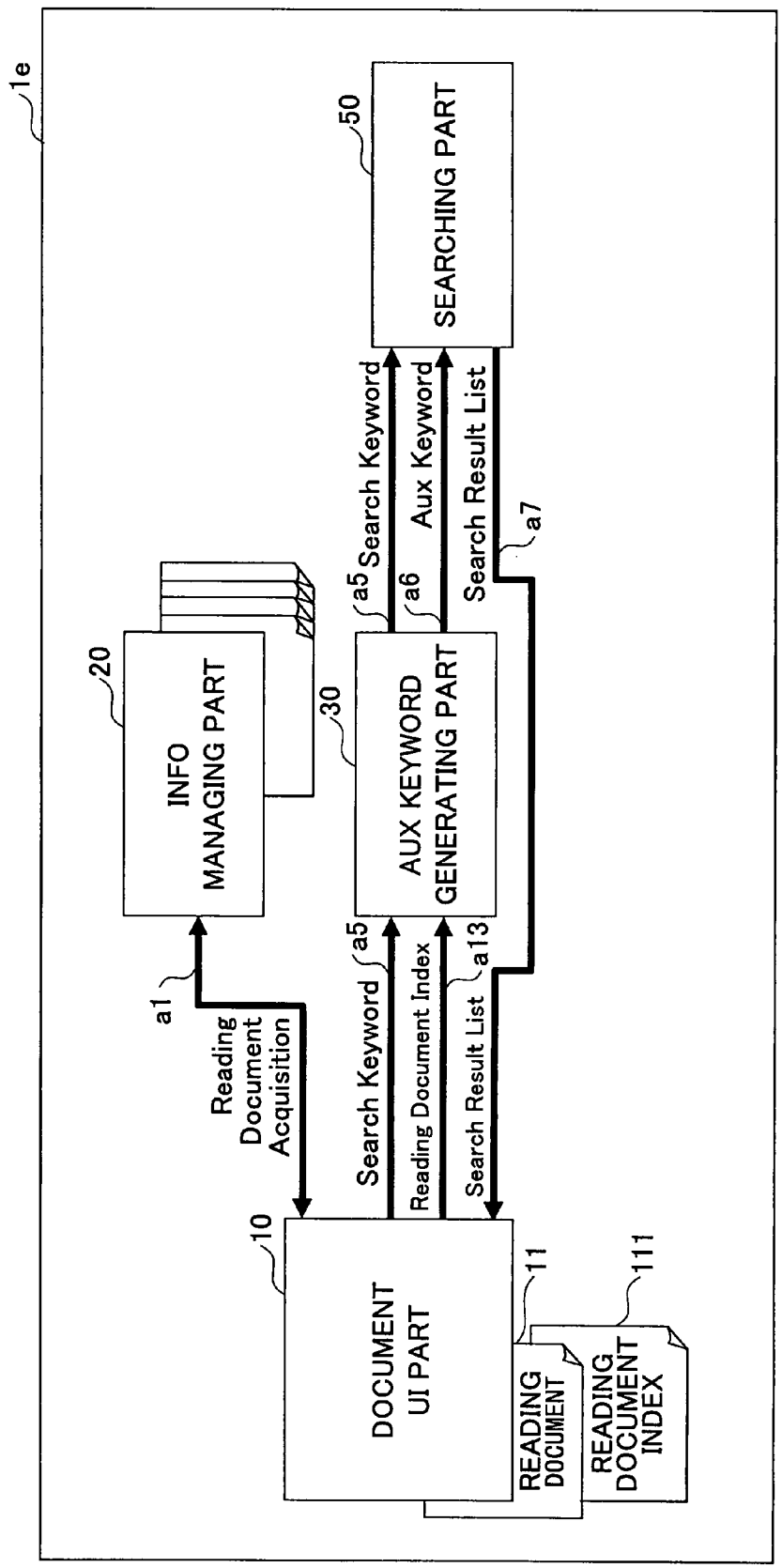
FIG. 15 is a diagram showing a functional structure of the information searching system of a fifth embodiment.

Next, a description will be given of a fifth embodiment, which is a modification of the first embodiment. FIG. 15 is a diagram showing a functional structure of the information searching system of the fifth embodiment. In FIG. 15, those parts that are the same as those corresponding parts in FIG. 2 are designated by the same reference numerals, and a description thereof will be omitted.

In an information searching system 1e shown in FIG. 15, the index file part 40 is not included as a constituent element. This is because the fifth embodiment is characterized by the structure of the reading document 11. In other words, in the reading document 11 of the fifth embodiment, the index information (reading document index 111) of the reading document 11 is included within the document file and managed. For example, the reading document index 111 is added to the reading document 11 as a visible or invisible meta data. Compared to the index information that is created by crawling of the index file part 40 for the purpose of search, the reading document index 111 that is added for every reading document 11 is characterized in that the reading document index 111 can be created and added according to the intentions of the author of the document.

Accordingly, in the fifth embodiment, the auxiliary keyword generating apparatus 30 acquires the reading document index 111 from the document UI part 10 (a13), and generates the auxiliary keyword based on the reading document index 111. The searching part 50 executes the search based on the search keyword that is input via the document UI part 10 and the auxiliary keyword that is generated by the auxiliary keyword generating part 30 (a5 and a6), and returns the search result list to the document UI part 10 (a7).

Figure 16:
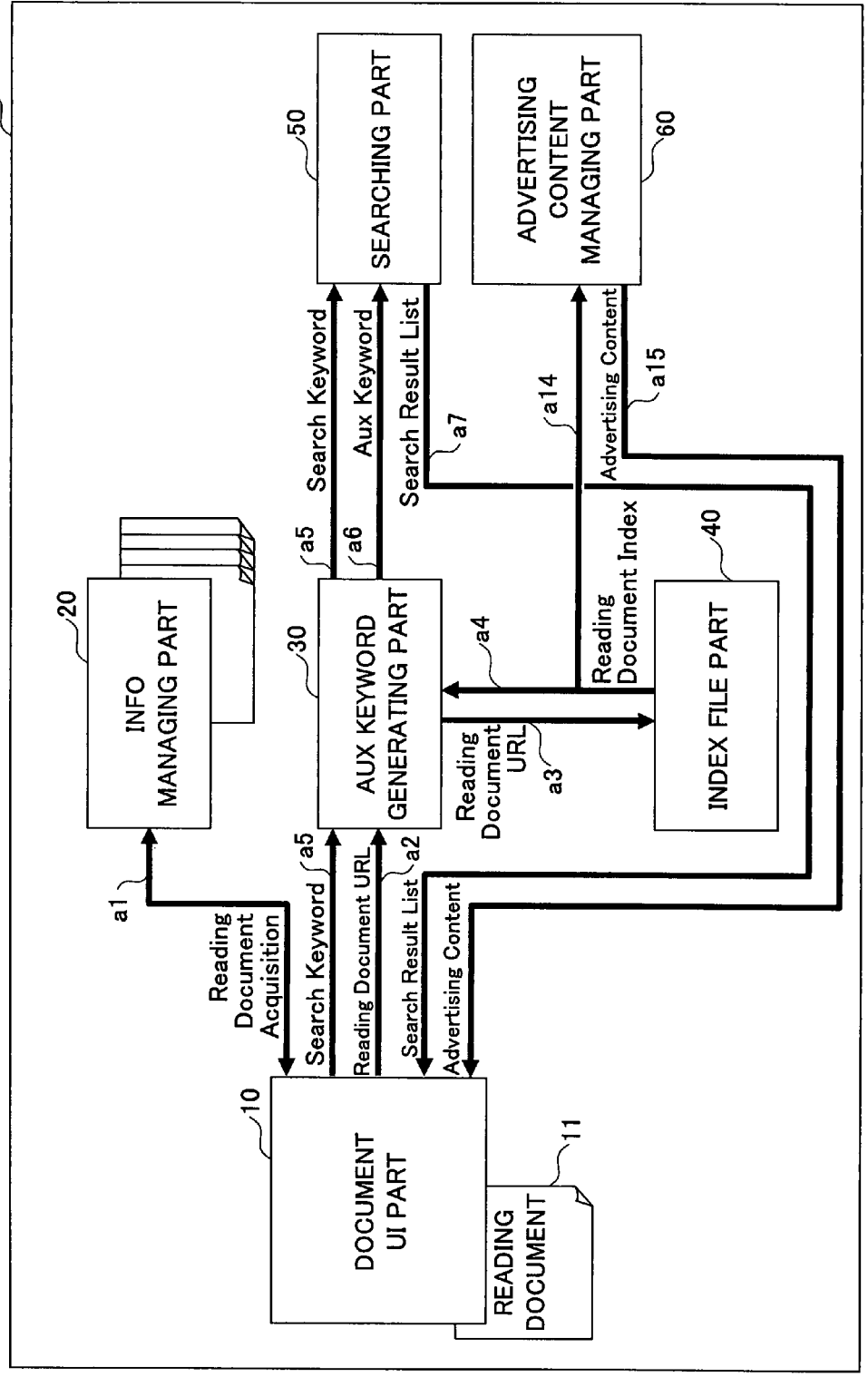
FIG. 16 is a diagram showing a functional structure of the information searching system of a sixth embodiment.

Next, a description will be given of a sixth embodiment. FIG. 16 is a diagram showing a functional structure of the information searching system of the sixth embodiment. In FIG. 16, those parts that are the same as those corresponding parts in FIG. 2 are designated by the same reference numerals, and a description thereof will be omitted.

In an information searching system 1f shown in FIG. 16, an advertising content managing part 60 is newly provided as a constituent element. The advertising content managing part 60 manages various advertising contents, and has a function of searching the advertising contents. More particularly, the advertising content managing part 60 receives a character string such as a word as input information, and searches and outputs the advertising content having a close relationship or a high association with the input information. In other words, the advertising content managing part 60 covers the function for realizing a search type advertising method.

According to the conventional search type advertising method, the advertising content is selected and displayed based solely on the search keyword. However, such a structure introduces at least two problems. The first problem is that the search keyword is not always the target of the user's interest. For this reason, it is conventionally difficult to increase the possibility of displaying the advertising content that is the target of the user's interest. The second problem is that it is difficult to distinguish the displayed search result and the advertising content, which is not preferable from the point of view of the reliability of the search.

Accordingly, the advertising content managing part 60 of the sixth embodiment is designed to solve these two problems. More particularly, the advertising content managing part 60 receives, as the input information, the index information (reading document index) of the reading document 11 that is managed by the index file part 40 (a14), and selects or searches, as the display target, the advertising content having a close relationship or a high association with the reading document index of the reading document 11 that is presently being read or inspected. The advertising content that is output from the advertising content managing part 60 is transferred to the document UI part 10 (a15), and is displayed together with the search result list from the searching part 50 (a7).

Figure 17:
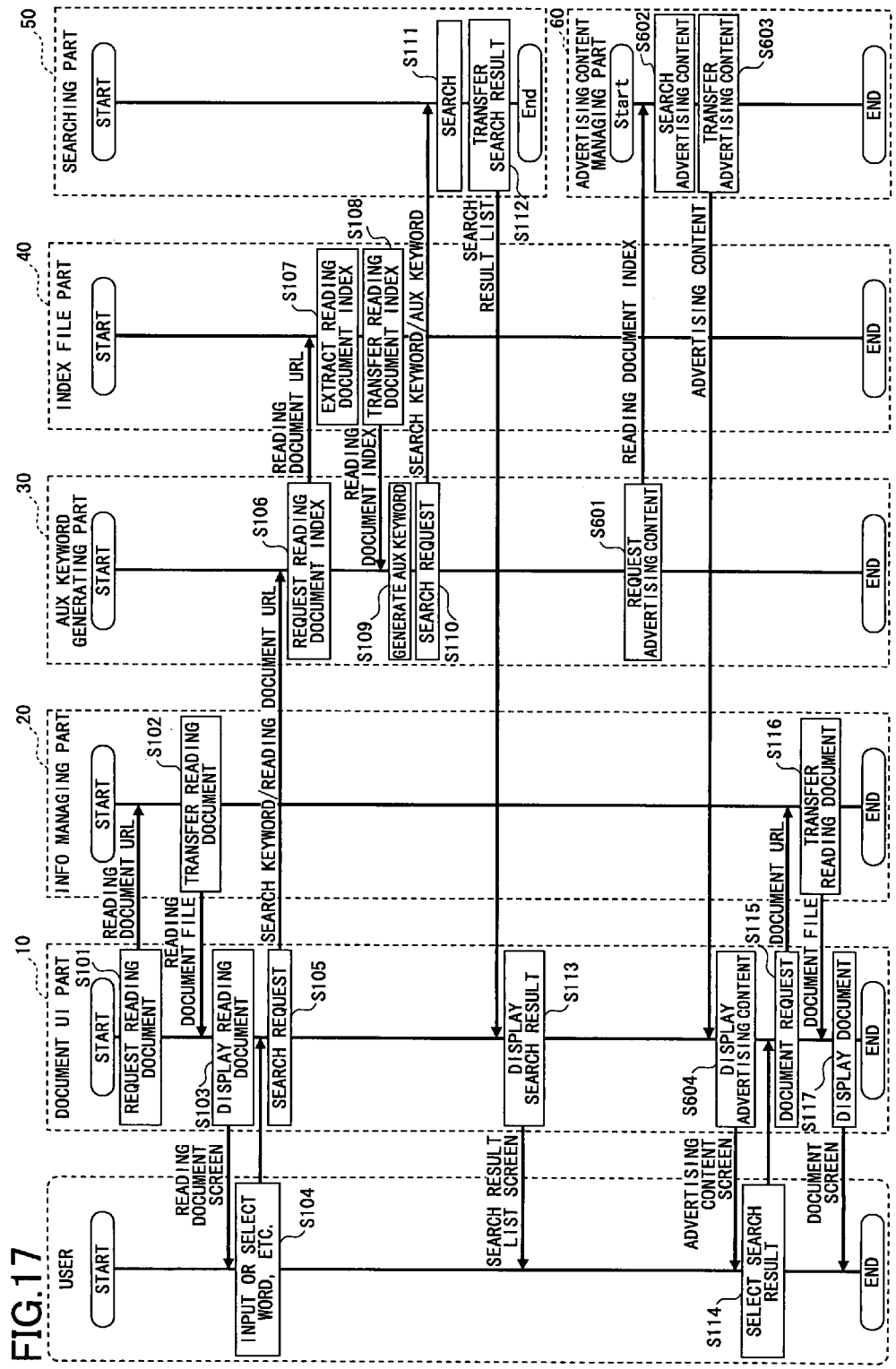
FIG. 17 is a diagram for explaining the processing sequence of the information searching system of the sixth embodiment.

Next, a description will be given of the processing sequence of the information searching system 1f shown in FIG. 16. FIG. 17 is a diagram for explaining the processing sequence of the information searching system of the sixth embodiment. In FIG. 17, those steps that are the same as those corresponding steps in FIG. 5 are designated by the same reference numerals, and a description thereof will be omitted.

After the steps S101 through S113, the auxiliary keyword generating part 30 transfer the reading document index that is acquired in the step S108 with respect to the advertising content managing part 60, and requests the advertising content managing part 60 to provide the advertising content (S601).

Then, the advertising content managing part 60 selects and transfers the advertising content corresponding to the reading document index to the document UI part 10 (S602 and S603). The document UI part 10 displays the advertising content together with the search result list (S604). The process carried out thereafter (S114 through S117) is the same as that of FIG. 5 described above.

Therefore, according to the information searching system 1f of the sixth embodiment, the advertising content that is displayed together with the search result is selected based on the index information (reading document index) of the reading document 11. The reading document index is a set of words describing the feature of the reading document, and describes the target of the user's more universal interest compared to the search keyword. Hence, it is possible to increase the possibility of displaying the advertising content that corresponds to the target of the user's more universal interest, and a high Clock Through Rate (CTR) can be expected. Of course, the advertising content may be selected based on information other than the correspondence with the reading document index, and for example, the advertising content may be selected with a probability depending upon the advertising rates paid.

In addition, the display timing of the advertising content does not necessarily have to be the same as the display timing of the search result, and the advertising content may be displayed at an arbitrary timing after the display of the search result. The advertising content corresponding to the target of the user's universal interest may have an arbitrary display timing.

Figure 18:
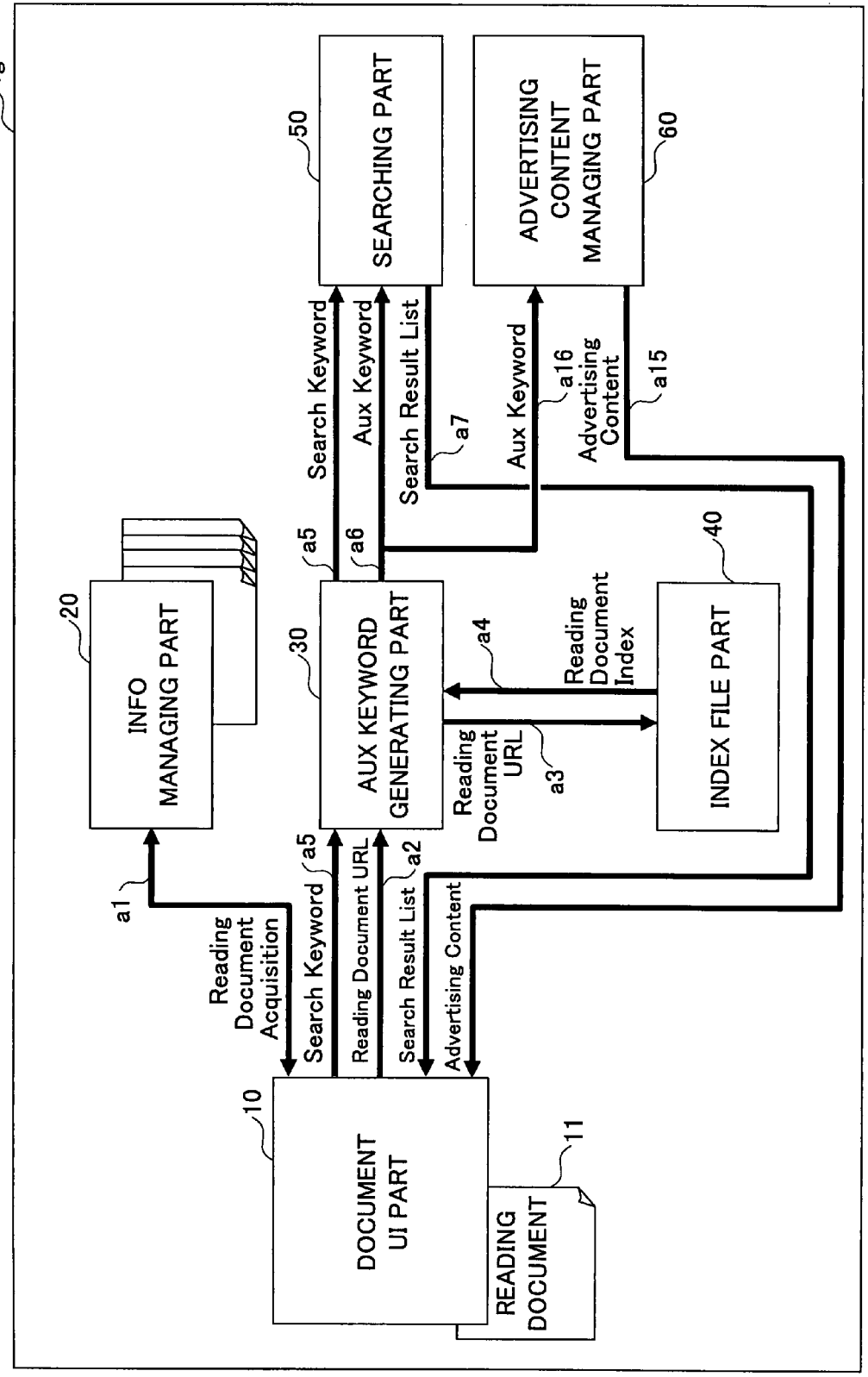
FIG. 18 is a diagram showing a functional structure of the information searching system of a seventh embodiment.

Next, a description will be given of a seventh embodiment, which is a modification of the sixth embodiment. FIG. 18 is a diagram showing a functional structure of the information searching system of the seventh embodiment. In FIG. 18, those parts that are the same as those corresponding parts in FIG. 16 are designated by the same reference numerals, and a description thereof will be omitted.

In an information searching system 1g shown in FIG. 18, the advertising content managing part 60 receives, as the input information, the auxiliary keyword that is generated by the auxiliary keyword generating part 30, and selects the advertising content corresponding to the auxiliary keyword (a16). Hence, the document UI part 10 displays the advertising content corresponding to the auxiliary keyword, together with the search result list (a15).

According to the information searching system 1g of the seventh embodiment, the advertising content is selected based on the auxiliary keyword which is considered to more conspicuously describe the feature of the reading document compared to the reading document index. For this reason, it is possible to provide the advertising content that is more in line with the feature of the reading document.

Figure 19:
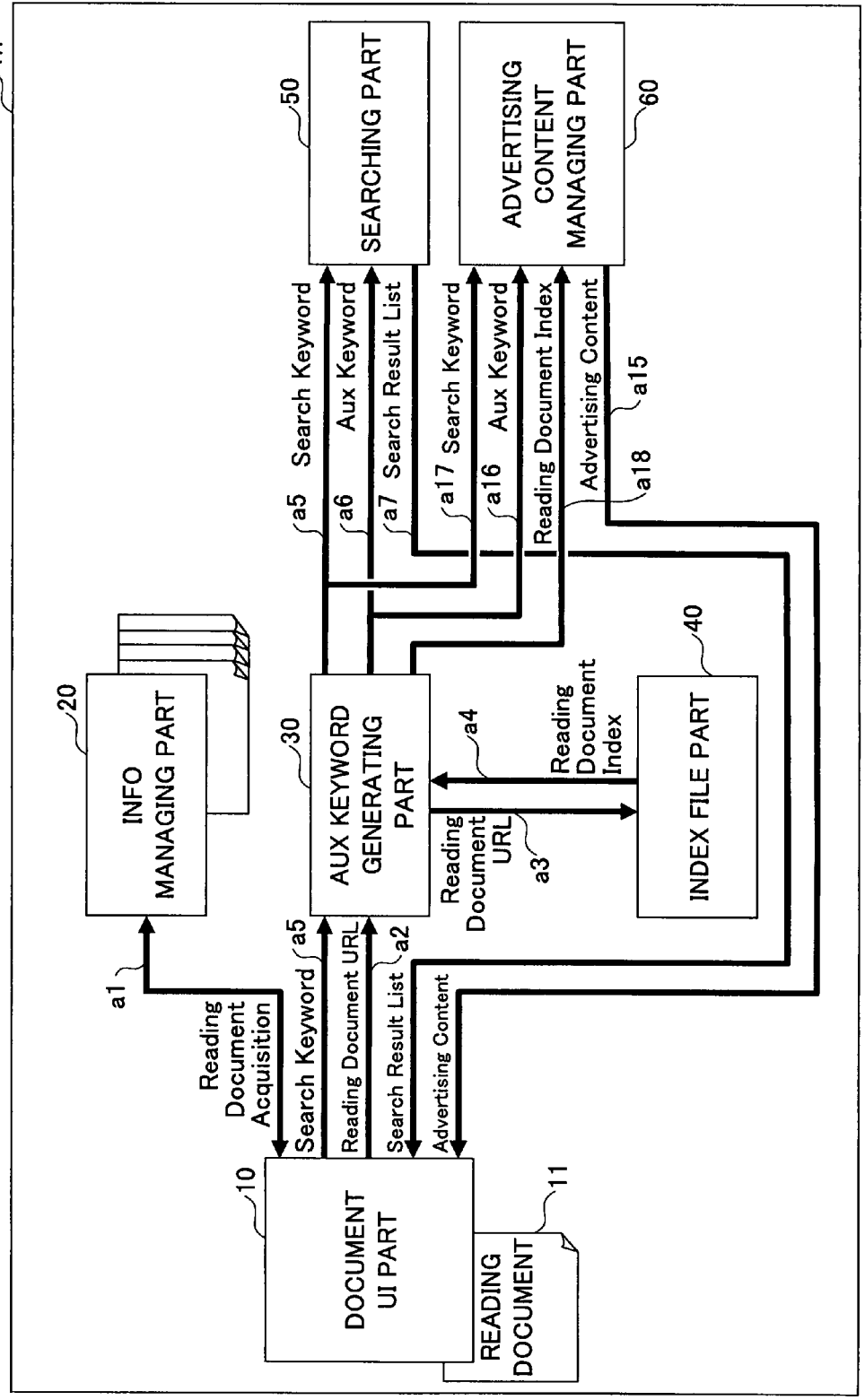
FIG. 19 is a diagram showing a functional structure of the information searching system of an eighth embodiment.

Next, a description will be given of an eighth embodiment, which is a modification of the sixth or seventh embodiment. FIG. 19 is a diagram showing a functional structure of the information searching system of the eighth embodiment. In FIG. 19, those parts that are the same as those corresponding parts in FIG. 16 or FIG. 18 are designated by the same reference numerals, and a description thereof will be omitted.

In an information searching system 1h shown in FIG. 19, the advertising content managing part 60 receives, as the input information, an arbitrary combination of the search keyword (a17), the reading document index (a18) and the auxiliary keyword (a16) generated by the auxiliary keyword generating part 30, and selects the advertising content corresponding to the input information. Hence, the document UI part 10 displays the advertising content corresponding to the input information, together with the search result list (a15).

According to the information searching system 1h of the eighth embodiment, it is possible to realize a search type advertising method that displays the advertising content corresponding to an arbitrary combination of the reading document index, the auxiliary keyword and the search keyword. One of the reading document index and the auxiliary keyword may be used, and the search keyword may be additionally used if necessary. This is because, the reading document index, the auxiliary keyword and the search keyword describe the target of the user's universal interest in this order with the reading document index describing the most universal interest. In other words, the search keyword, the auxiliary keyword and the reading document index describe the target of the user's instantaneous interest in this order with the search keyword describing the most instantaneous interest.

Figure 20:
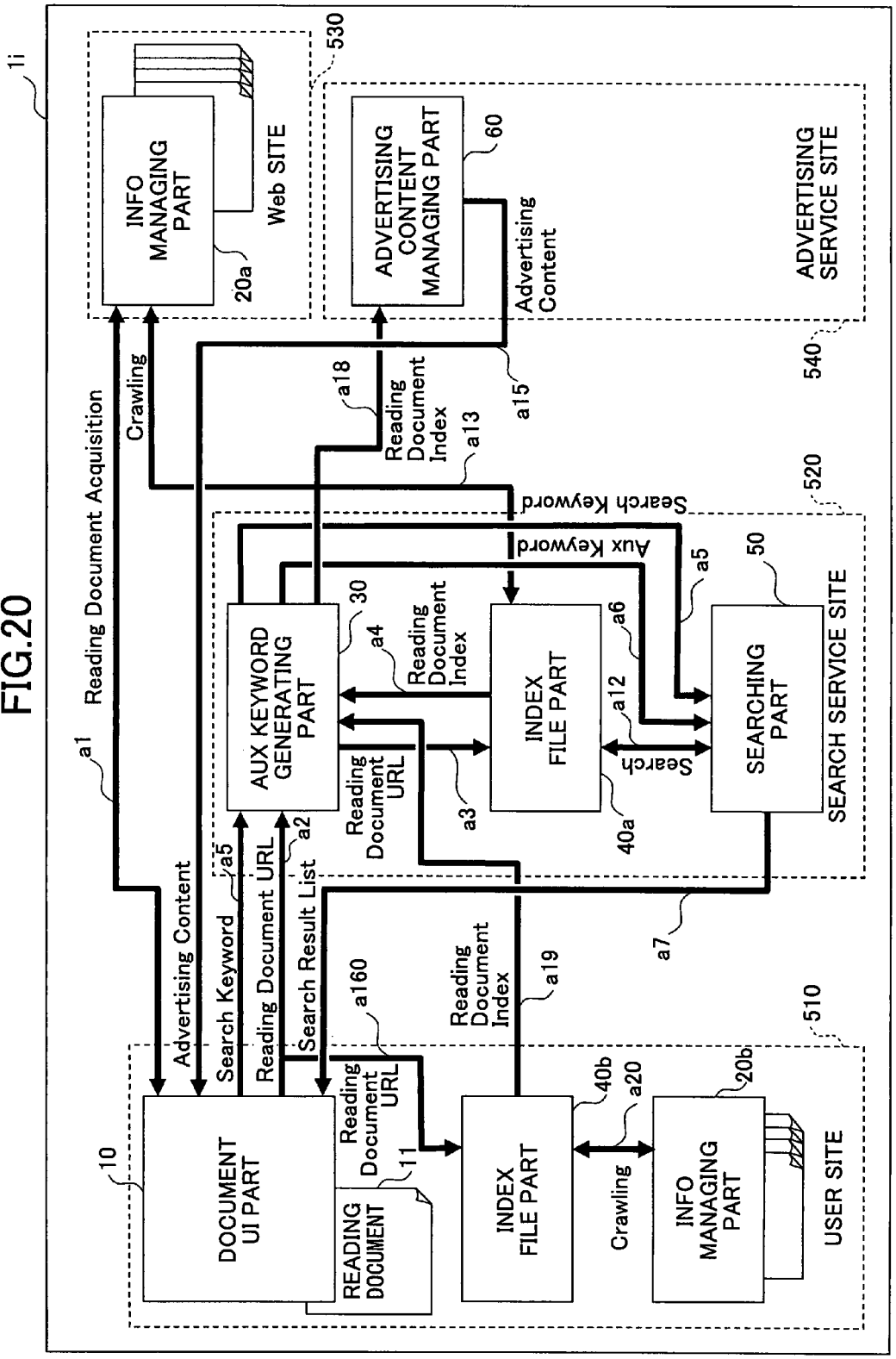
FIG. 20 is a diagram showing a functional structure of the information searching system of a ninth embodiment.

Next, a description will be given of a ninth embodiment. FIG. 20 is a diagram showing a functional structure of the information searching system of the ninth embodiment. In FIG. 20, those parts that are the same as those corresponding parts in FIG. 16 are designated by the same reference numerals, and a description thereof will be omitted.

In the ninth embodiment, the site of each of the parts forming the information searching system 1f of the sixth embodiment (search type advertising method corresponding to the reading document index) is definitely specified.

In an information searching system 1i shown in FIG. 20, the information managing part 20 is implemented in a Web site 530 (information managing part 20a) or a user site 510 (information managing part 20b). The document UI part 10 is implemented in a user PC 511 of the user site 510. The index file part 40 is implemented in a search service site 520 (index file part 40a) on the Web or, in the user site 510 (index file part 40b). The auxiliary keyword generating part 30 and the searching part 50 are implemented in the search service site 520. In addition, the advertising content managing part 60 is implemented in an advertising service site 540 on the Web.

Since the exchange of information among the various parts of the information searching system 1i is as described above in conjunction with FIG. 16, a description thereof will be omitted for the ninth embodiment.

Figure 21:
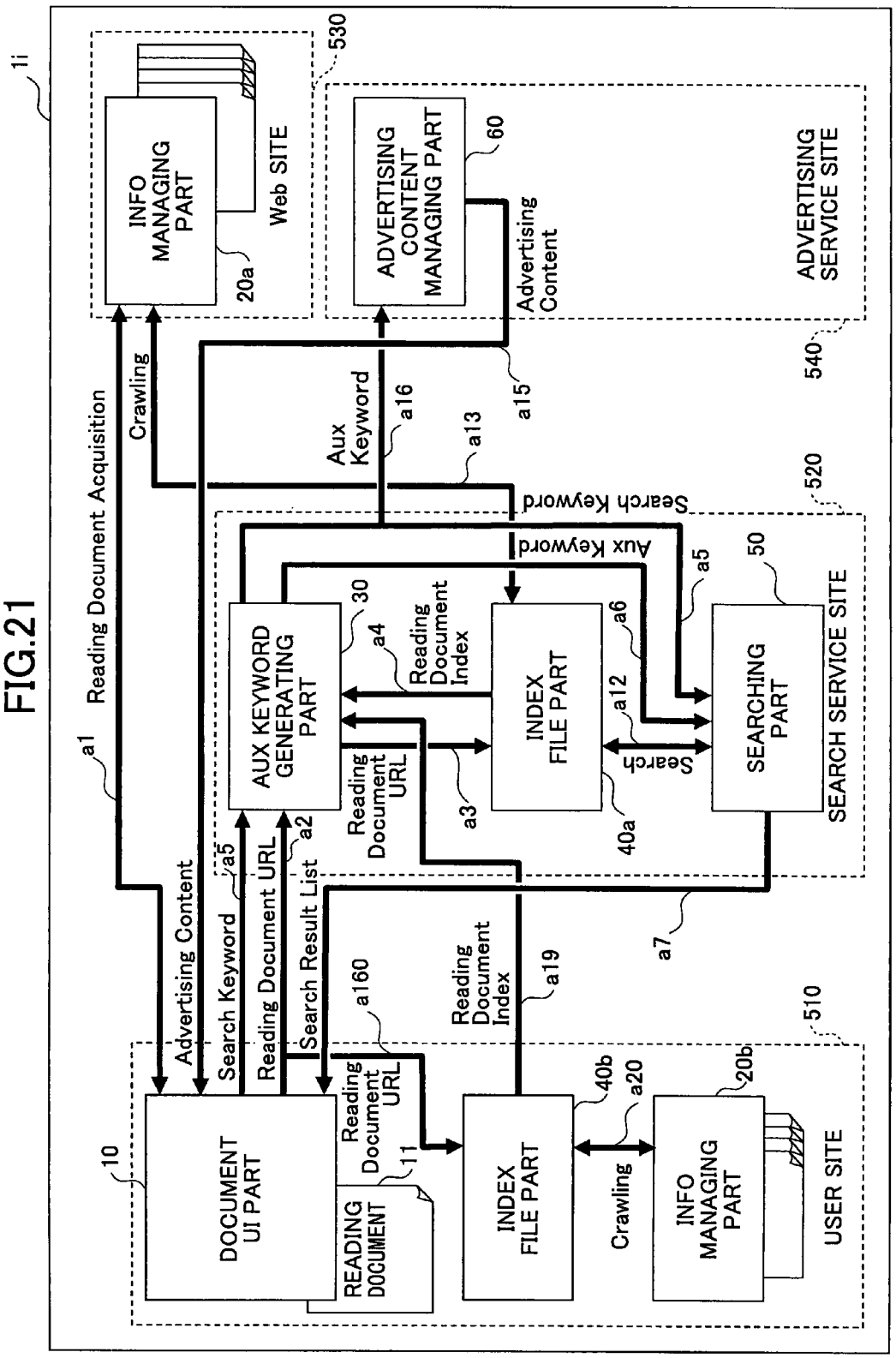
FIG. 21 is a diagram showing a functional structure of the information searching system of a tenth embodiment.

Next, a description will be given of a tenth embodiment. FIG. 21 is a diagram showing a functional structure of the information searching system of the tenth embodiment. In FIG. 21, those parts that are the same as those corresponding parts in FIG. 18 or FIG. 20 are designated by the same reference numerals, and a description thereof will be omitted.

In the tenth embodiment, the site of each of the parts forming the information searching system 1f of the seventh embodiment (search type advertising method corresponding to the auxiliary keyword) is definitely specified.

In an information searching system 1j shown in FIG. 21, the sites in which each of the parts are implemented are the same as those in FIG. 20. In addition, since the exchange of information among the various parts of the information searching system 1j is as described above in conjunction with FIG. 18, a description thereof will be omitted for the tenth embodiment.

Figure 22:
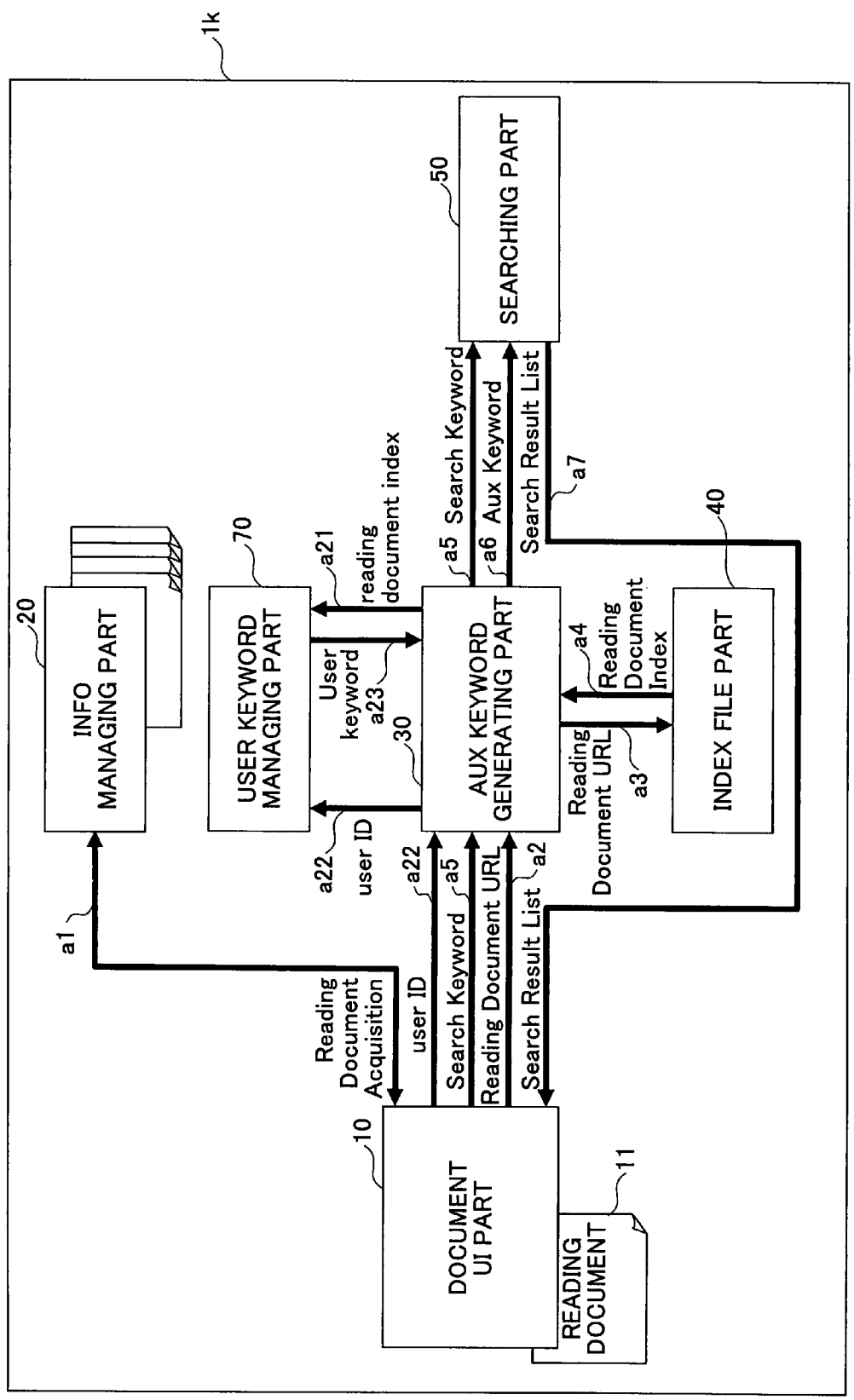
FIG. 22 is a diagram showing a functional structure of the information searching system of an eleventh embodiment.

Next, a description will be given of an eleventh embodiment. FIG. 22 is a diagram showing a functional structure of the information searching system of the eleventh embodiment. In FIG. 22, those parts that are the same as those corresponding parts in FIG. 2 are designated by the same reference numerals, and a description thereof will be omitted.

In an information searching system 1k shown in FIG. 22, a user keyword managing part 70 is newly provided as a constituent element. The user keyword managing part 70 records and manages, as user keywords, the reading document indexes acquired from the index file part 40, for every user (a21). In addition, the user keyword managing part 70 updates the user keyword based on the reading document index acquired from the index file part 40. In other words, the user keyword managing part 70 stores, as the user keywords, the reading document indexes that have been acquired based on past searches, for every user. The user keywords that are managed for every user are valid information related to each user's interest and business.

The auxiliary keyword generating part 30 acquires the user keyword from the user keyword managing part 70 (a23), and adds the acquired user keyword to the auxiliary keyword. As a result, the auxiliary keyword related to the reading document 11 and the auxiliary keyword related to the user are used for the search, and a search result having less noise can be expected.

The purpose of the auxiliary keyword is to reduce the noise in the search result. The reading document index is used for the filtering by the feature of the reading document. On the other hand, in the eleventh embodiment, the filtering is realized using the user keyword that is recorded with the context related to the user's search.

Figure 23:
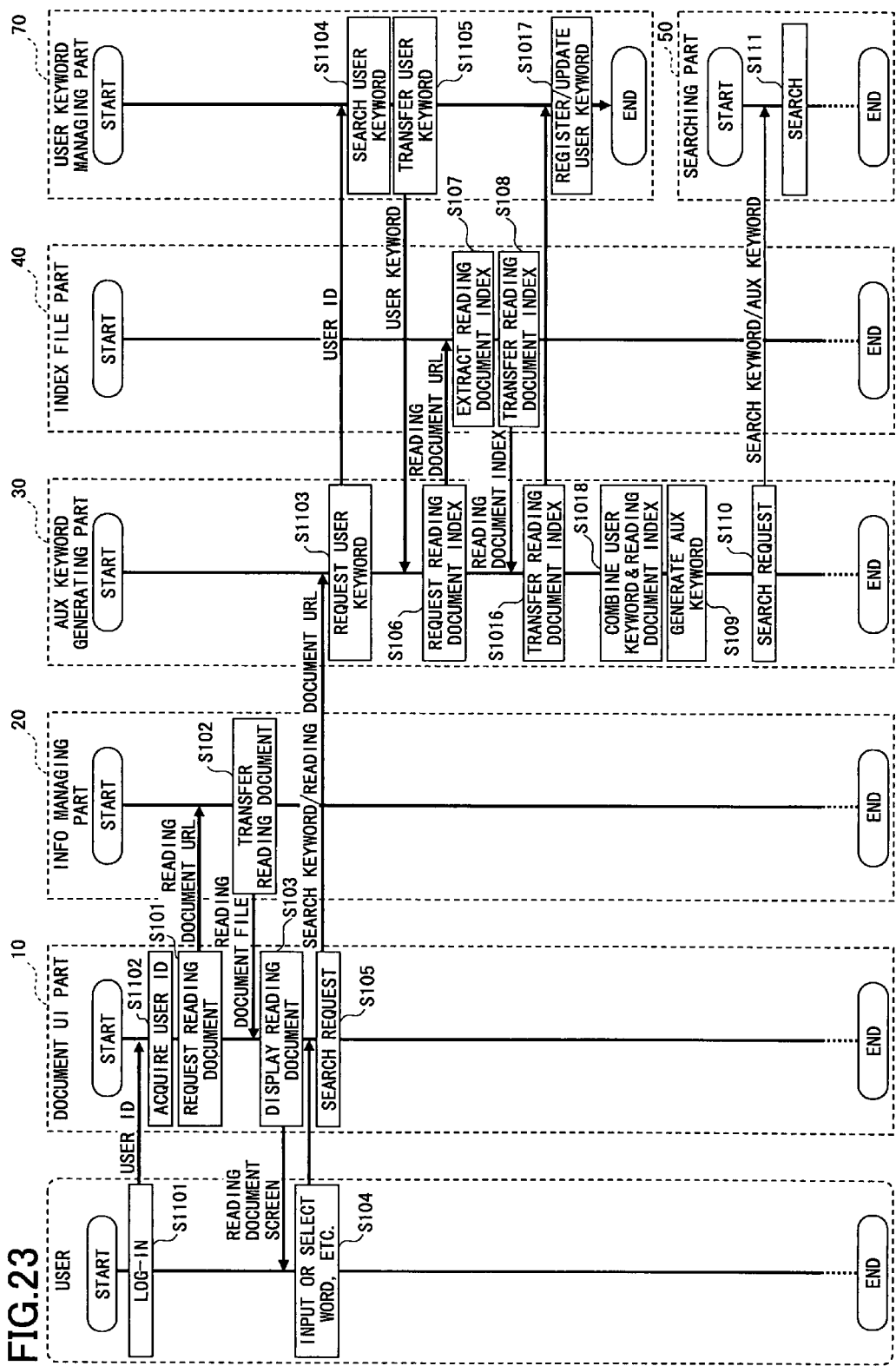
FIG. 23 is a diagram for explaining the processing sequence of the information searching system of the eleventh embodiment.

Next, a description will be given of the processing sequence of the information searching system 1k shown in FIG. 22. FIG. 23 is a diagram for explaining the processing sequence of the information searching system of the eleventh embodiment. In FIG. 23, those steps that are the same as those corresponding steps in FIG. 5 are designated by the same reference numerals, and a description thereof will be omitted.

In the eleventh embodiment, identification information of the user, such as a user ID, is input in advance on a log-in screen or the like that is displayed by the document UI part 10 (S1101), and the document UI part 10 acquires the user ID (S1102). Then, as described above in conjunction with FIG. 5, the steps S101 through S103 are executed, and the reading document 11 is displayed.

When the search keyword is input or selected and the execution of the search is instructed (S104), the document UI part 10 sends a search request with respect to the auxiliary keyword generating part 30 together with the user ID, the search keyword and the reading document URL (S105).

Next, the auxiliary keyword generating part 30 transfers the user ID to the user keyword managing part 70, and requests the user keyword managing part 70 to provide the user keyword (S1103). The user keyword managing part 70 searches the user keyword corresponding to the user ID, and transfers the searched user keyword to the auxiliary keyword generating part 30 (S1105).

When the auxiliary keyword generating part 30 acquires the reading document index from the index file part 40 (S106 through S108), the auxiliary keyword generating part 30 transfers the reading document index and the user ID to the user keyword managing part 70 (S1016). The user keyword managing part 70 updates the user keyword of the use based on the user ID and the reading document index that are transferred from the auxiliary keyword generating part 30 (S1017).

In addition, the auxiliary keyword generating part 30 combines the user keyword and the reading document index (S1018). Then, the auxiliary keyword generating part 30 deletes from the combined information the index information overlapping with the search keyword, and generates the auxiliary keyword by narrowing the candidates according to the evaluation based on the occurrence or the like (S109).

Figure 24:
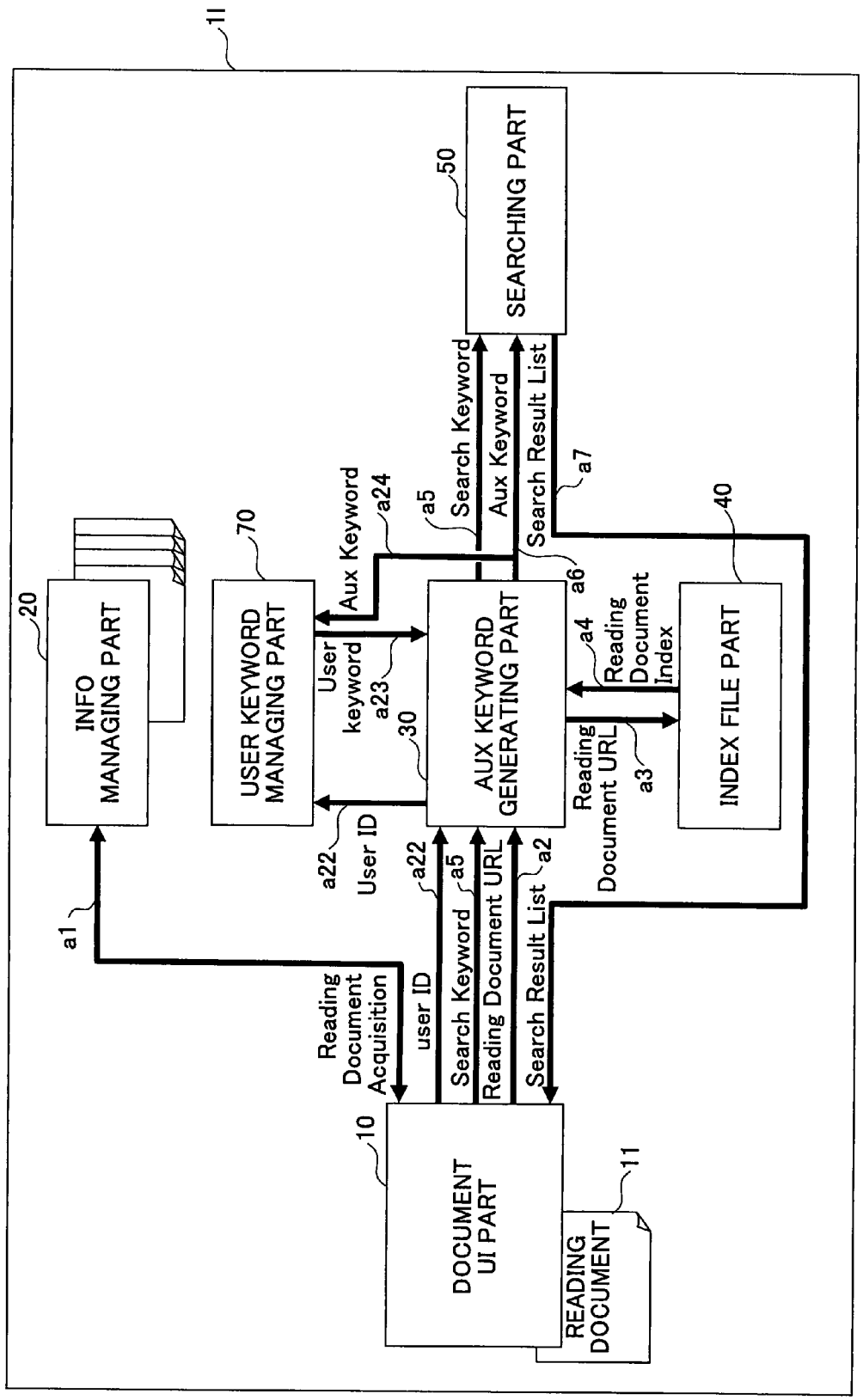
FIG. 24 is a diagram showing a functional structure of the information searching system of a twelfth embodiment.

Next, a description will be given of a twelfth embodiment, which is a modification of the eleventh embodiment. FIG. 24 is a diagram showing a functional structure of the information searching system of the twelfth embodiment. In FIG. 24, those parts that are the same as those corresponding parts in FIG. 22 are designated by the same reference numerals, and a description thereof will be omitted.

In an information searching system 11 shown in FIG. 24, the user keyword managing part 70 records and manages, as the user keywords, the auxiliary keywords that are generated by the auxiliary keyword generating part 30 based on the reading document indexes (a24). The user keywords that are managed for every user are valid information related to each user's interest and business.

When generating the auxiliary keyword, the auxiliary keyword generating part 30 acquires the user keyword from the user keyword managing part 70 (a23), and adds the acquired user keyword to the auxiliary keyword. As a result, the auxiliary keyword related to the reading document 11 and the user keyword related to the user are used for the search, and a search result having less noise can be expected. In addition, the user keyword managing part 70 updates the user keyword based on the auxiliary keyword acquired from the auxiliary keyword generating part 30 (a24).

Figure 25:
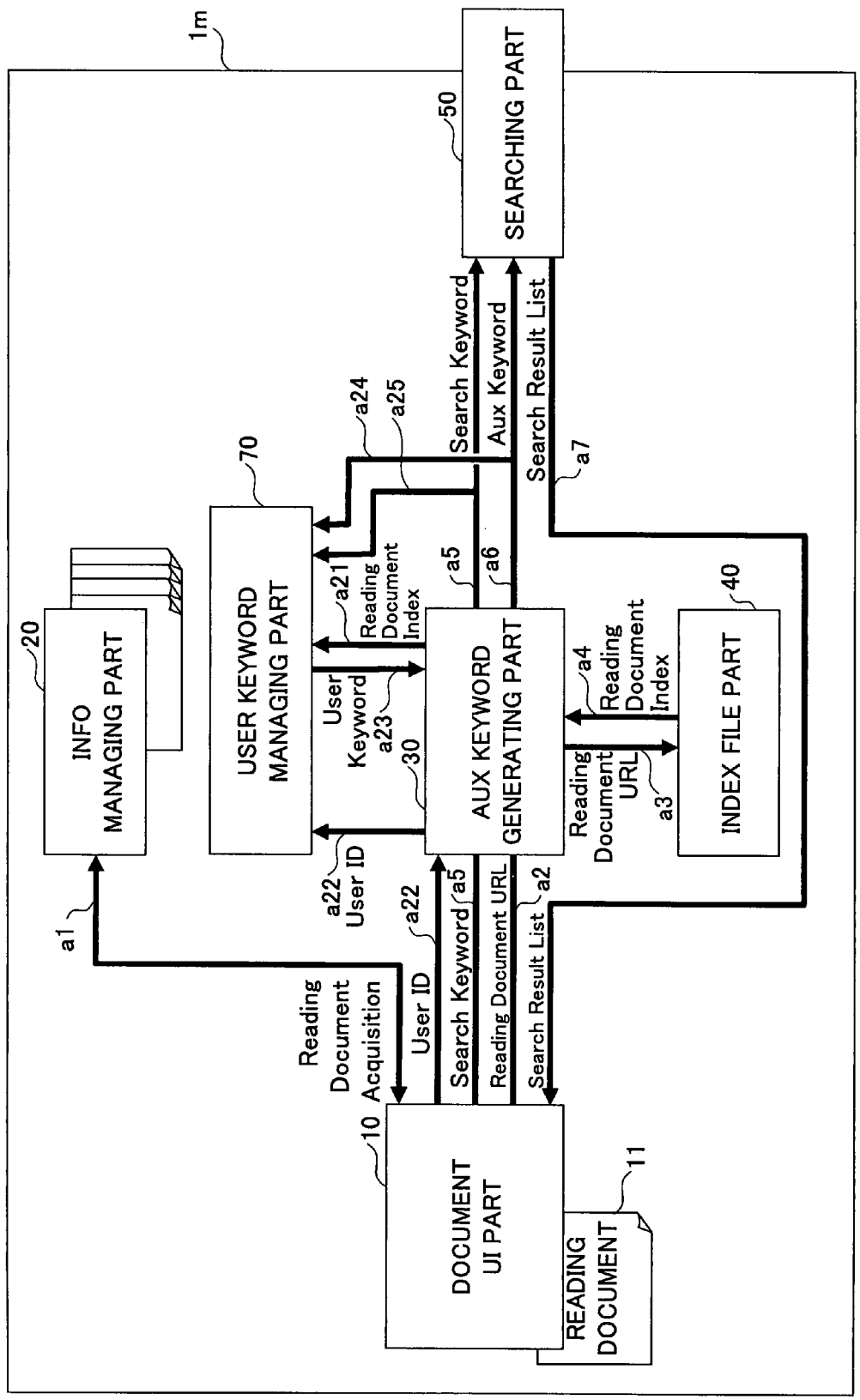
FIG. 25 is a diagram showing a functional structure of the information searching system of a thirteenth embodiment.

Next, a description will be given of a thirteenth embodiment, which is a modification of the tenth or twelfth embodiment. FIG. 25 is a diagram showing a functional structure of the information searching system of the thirteenth embodiment. In FIG. 25, those parts that are the same as those corresponding parts in FIG. 22 or FIG. 24 are designated by the same reference numerals, and a description thereof will be omitted.

In an information searching system 1m shown in FIG. 25, the user keyword managing part 70 acquires an arbitrary combination of the reading document index acquired from the index file part 40 (a21), the auxiliary keyword generated by the auxiliary keyword generating part 30 (a24), and the search keyword acquired by the document UI part 10 (a25), and records and manages the acquired arbitrary combination as the user keyword.

Because the search keyword is added to the user keyword and recorded and managed, the most recent target of the user's interest is reflected to the search result.

Furthermore, the user keyword managing part 70 updates the user keyword by the reading document index acquired from the index file part 40, the auxiliary keyword acquired from the auxiliary keyword generating part 30, and the search keyword acquired from the document UI part 10.

Figure 26:
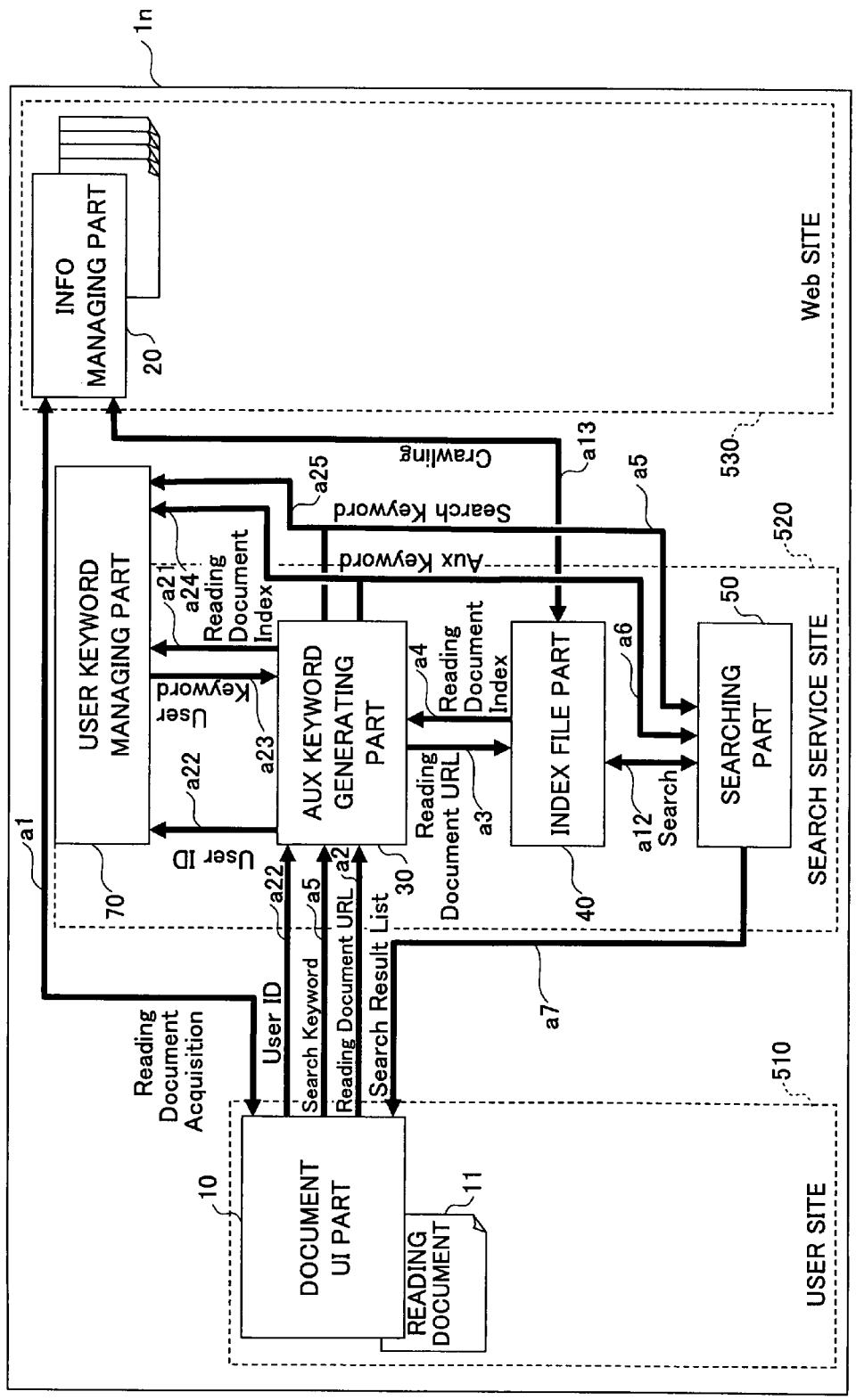
FIG. 26 is a diagram showing a functional structure of the information searching system of a fourteenth embodiment.

Next, a description will be given of a fourteenth embodiment. FIG. 26 is a diagram showing a functional structure of the information searching system of the fourteenth embodiment. In FIG. 26, those parts that are the same as those corresponding parts in FIG. 25 are designated by the same reference numerals, and a description thereof will be omitted.

In the fourteenth embodiment, the site of each of the parts forming the information searching system 1m of the thirteenth embodiment is definitely specified.

In an information searching system in shown in FIG. 26, the document UI part 10 is implemented in a user site 510. The user keyword managing part 70, the auxiliary keyword generating part 30, the index file part 40, and the searching part 50 are implemented in a search service site 520. The information managing part 20 is implemented in a Web site 530.

According to the structure shown in FIG. 26, the search service site 520 can utilize the index information, that is used for the search, as valid or valuable resources.

Figure 27:
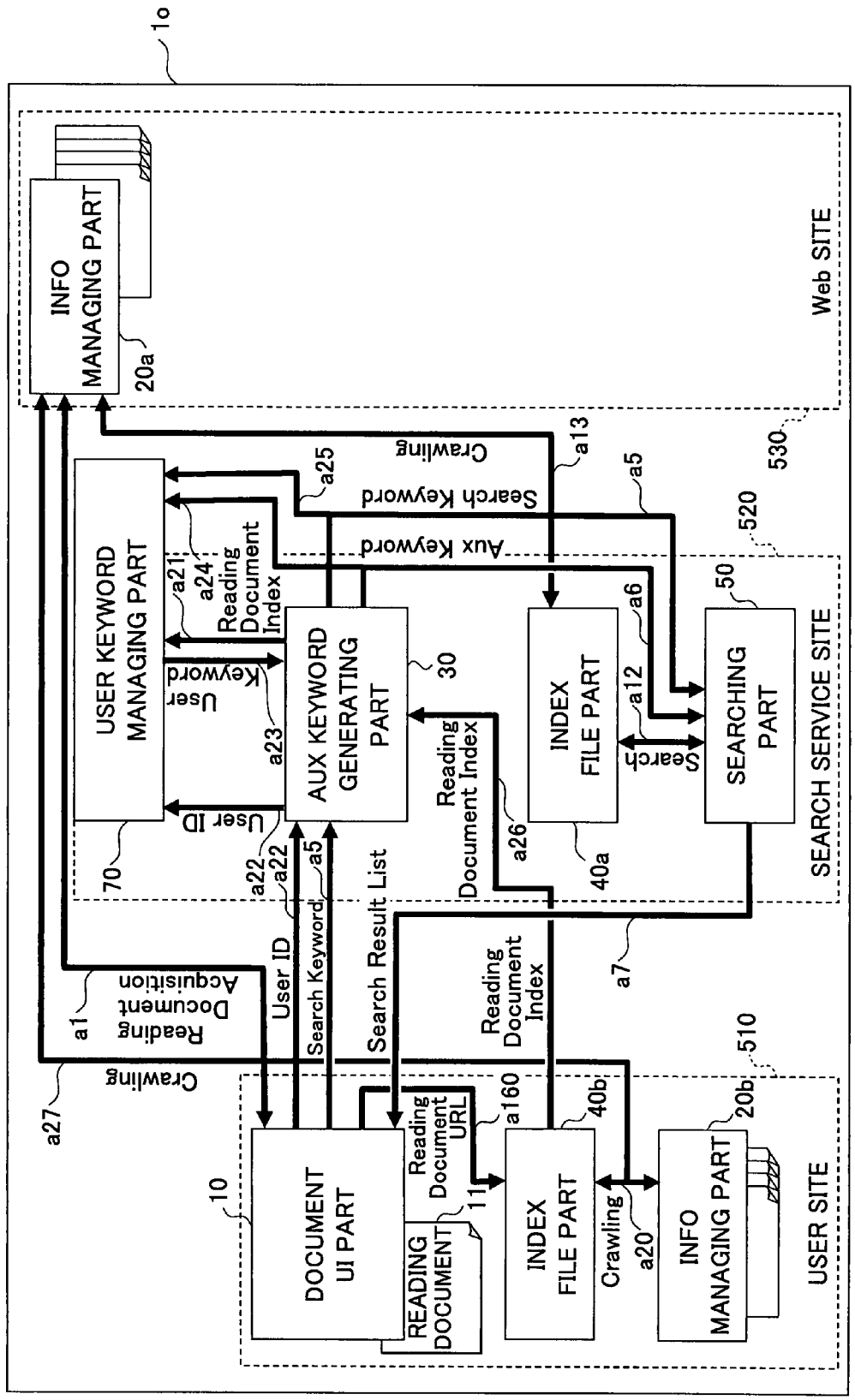
FIG. 27 is a diagram showing a functional structure of the information searching system of a fifteenth embodiment.

Next, a description will be given of a fifteenth embodiment. FIG. 27 is a diagram showing a functional structure of the information searching system of the fifteenth embodiment. In FIG. 27, those parts that are the same as those corresponding parts in FIG. 26 are designated by the same reference numerals, and a description thereof will be omitted.

In an information searching system 1o shown in FIG. 27, the index file part 40 (index file part 40b) and the information managing part 20 (information managing part 20b) are further implemented in the user site 510.

The index file part 40b in the user site 510 generates and manages index information of Intranet shared documents and personal documents, and index information of Web documents if necessary. The index information is used for generating the auxiliary keyword. In other words, the auxiliary keyword generating part 30 shown in FIG. 27 acquires the reading document index from the index file part 40b that is implemented in the user site 510 (a26), and generates the auxiliary keyword.

On the other hand, the index file part 40 in the search service site 520 is used only for the search (a13).

Figure 28:
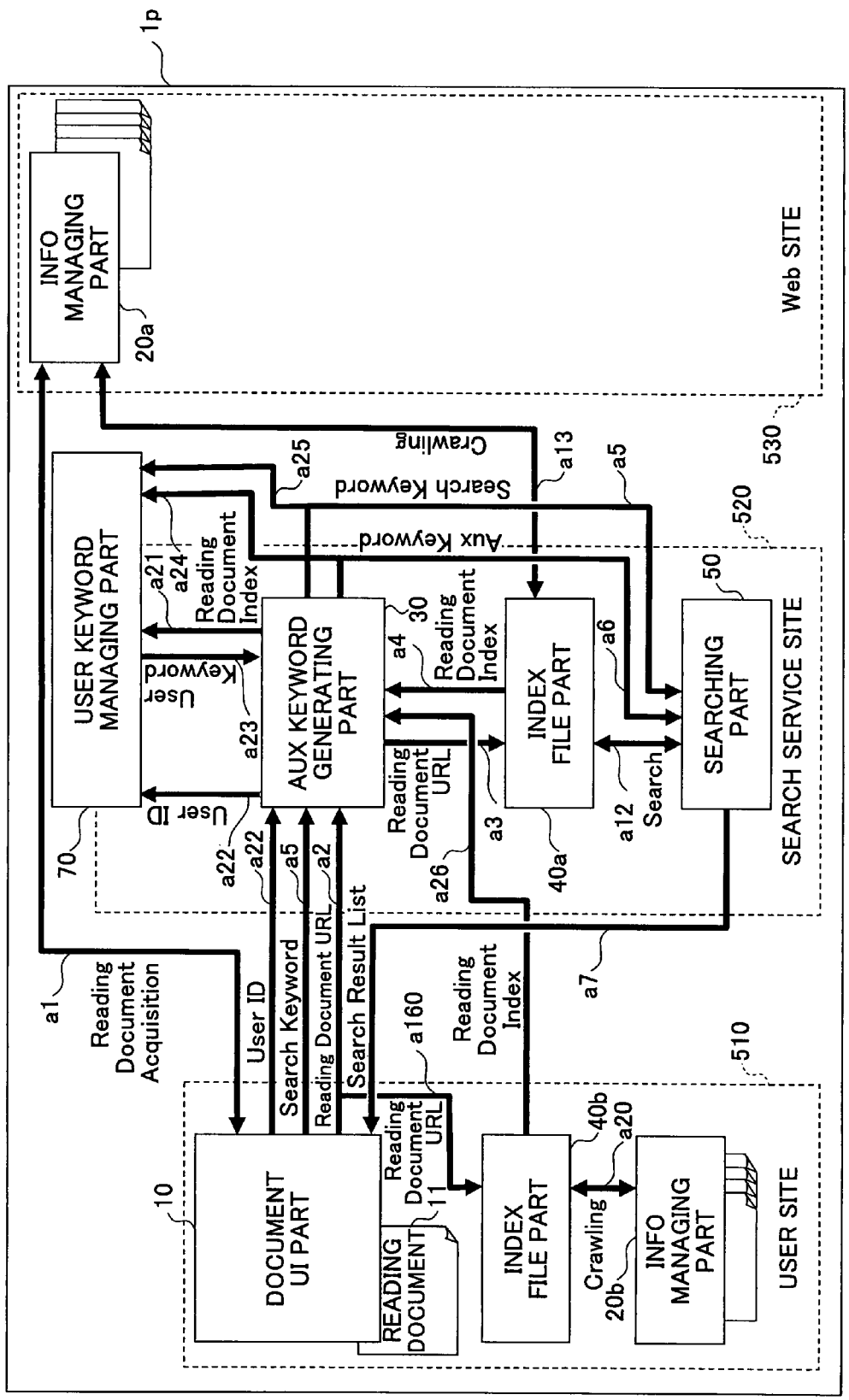
FIG. 28 is a diagram showing a functional structure of the information searching system of a sixteenth embodiment.

Next, a description will be given of a sixteenth embodiment. FIG. 28 is a diagram showing a functional structure of the information searching system of the sixteenth embodiment. In FIG. 28, those parts that are the same as those corresponding parts in FIG. 27 are designated by the same reference numerals, and a description thereof will be omitted.

In an information searching system $1p$ shown in FIG. 28, the auxiliary keyword generating part 30 acquires the reading document index from both the index file part 30a that is implemented in the search service site 520 and the index file part 40b that is implemented in the user site 510 (a4 and a26), and generates the auxiliary keyword.

Figure 29:
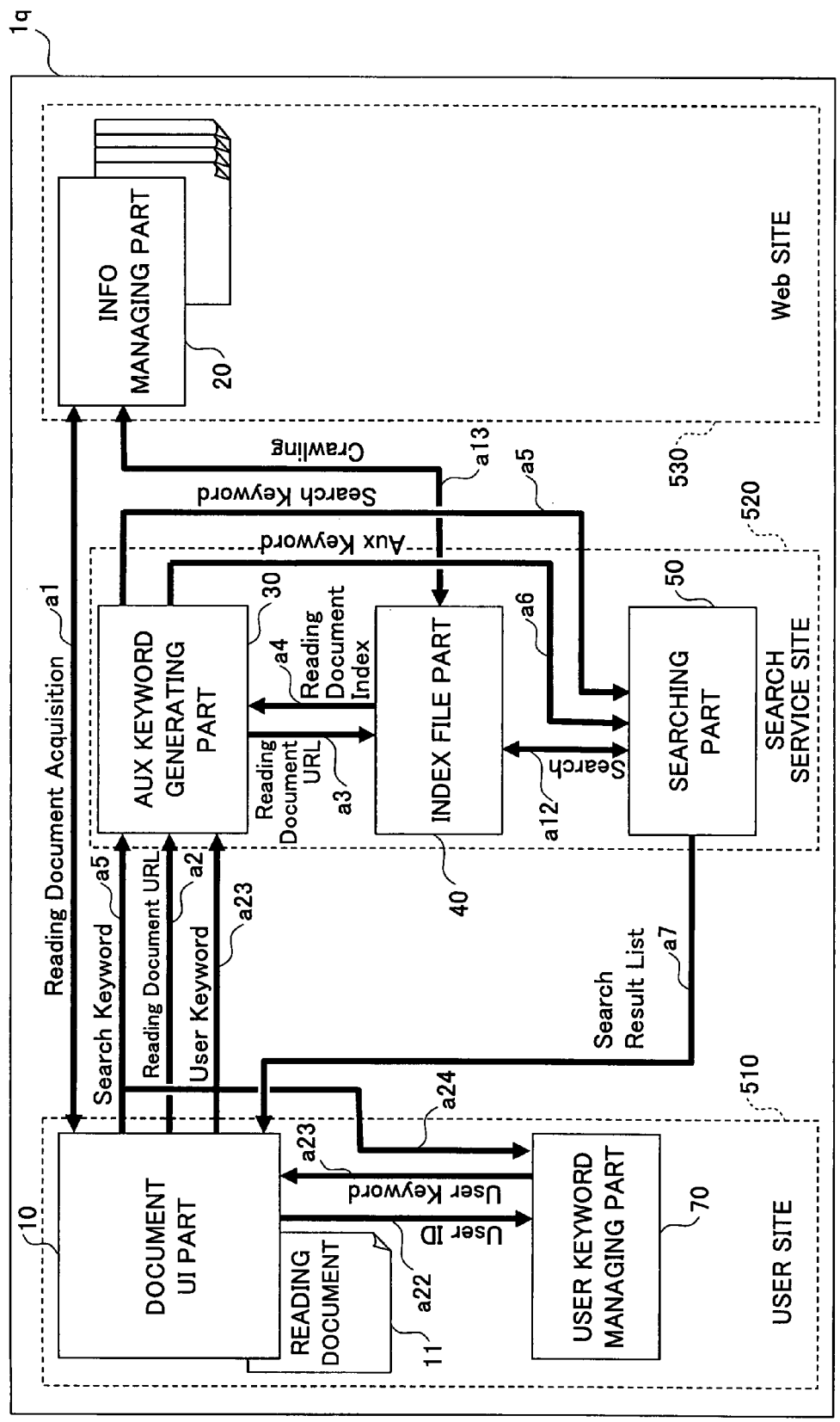
FIG. 29 is a diagram showing a functional structure of the information searching system of a seventeenth embodiment.

Next, a description will be given of a seventeenth embodiment. FIG. 29 is a diagram showing a functional structure of the information searching system of the seventeenth embodiment. In FIG. 29, those parts that are the same as those corresponding parts in FIG. 26 are designated by the same reference numerals, and a description thereof will be omitted.

In an information searching system $1q$ shown in FIG. 29, the use keyword managing part 70 is implemented in a user site 510, such as a server on the user's Intranet or a user PC 511. The user keyword is recorded in advance and managed by the user keyword managing part 70 together with the user ID, for every user, for use in personalizing the service and personalizing the advertising.

In FIG. 29, the user keyword in the user keyword managing part 70 is transferred to the auxiliary keyword generating part 30 in the search service site 520 via the document UI part 10, for example (a23). In this case, it is possible to pass the user keyword through a word filter (not shown) or the like that is implemented in the user site 510, so as to prevent personal information or confidential information, which could be included in the user keyword, from being transferred to the auxiliary keyword generating part 30.

In FIG. 29, the user keyword in the user keyword managing part 70 is updated by the search keyword (a24).

In each of the fourteenth embodiment (FIG. 26) through the seventeenth embodiment (FIG. 29) described above, the auxiliary keyword generating part 30 is implemented in the search service site 520 on the Web, and acquires the index information from the index file part 40 that is implemented in the user site 510 or the search service site 520 on the Web, and acquires the user keyword from the user keyword managing part 70.

This structure realizes the following two advantageous features to the search service site 520. First, it is possible to provide a good keyword search with reduced noise, which is a competitive advantage. Second, it is possible to acquire the reading document URL when the user makes the search request. This may be utilizes for personalized search and personalized advertising.

Figure 30:
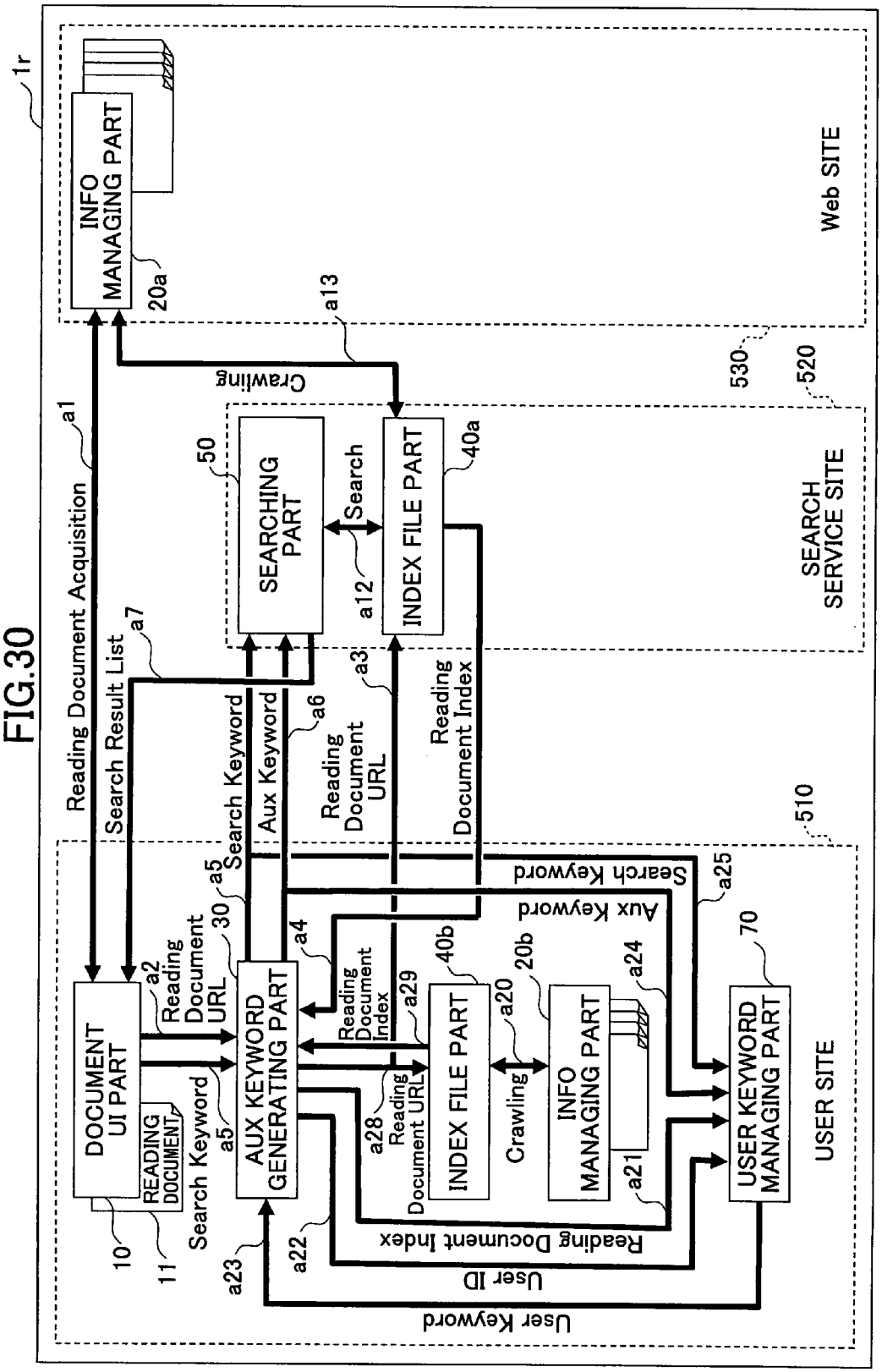
FIG. 30 is a diagram showing a functional structure of the information searching system of an eighteenth embodiment.

Next, a description will be given of an eighteenth embodiment. FIG. 30 is a diagram showing a functional structure of the information searching system of the eighteenth embodiment. In FIG. 30, those parts that are the same as those corresponding parts in FIG. 28 or FIG. 29 are designated by the same reference numerals, and a description thereof will be omitted.

In an information searching system $1r$ shown in FIG. 30, the auxiliary keyword generating part 30 is implemented in a user site 510. In addition, the index file part 40 is implemented in the user site 510 or a search service site 520. Moreover, the information managing part 20 is implemented in a Web site 530 or the user site 510.

In FIG. 30, the auxiliary keyword generating part 30 that is implemented in the user site 510 can generate the auxiliary keyword by acquiring the reading document index of the Web document from the index file part 40a that is implemented in the search service site 520 (a4), and acquiring the reading document index of the shared document or the like from the index file part 40 that is implemented in the user site 510.

Figure 31:
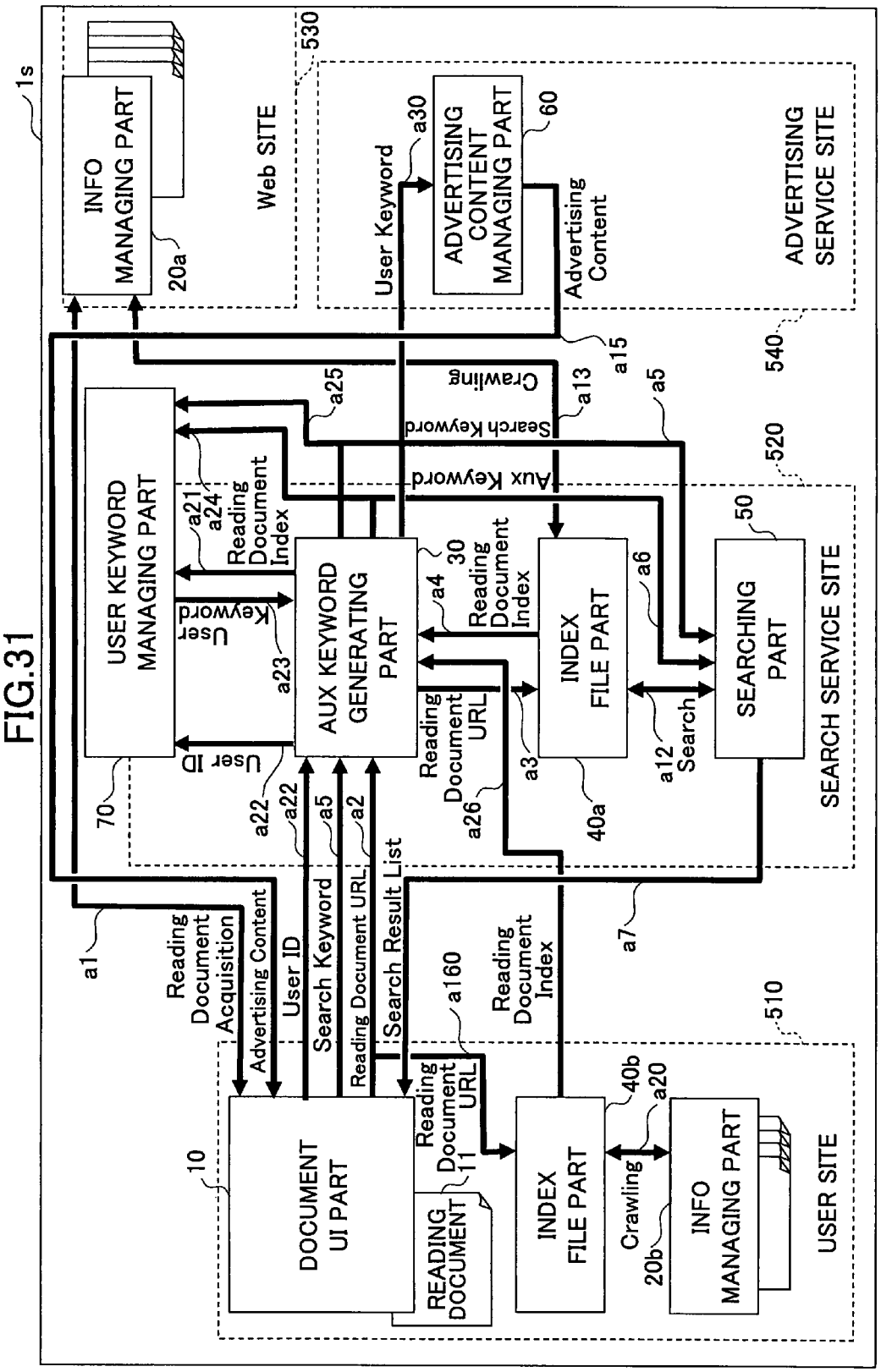
FIG. 31 is a diagram showing a functional structure of the information searching system of a nineteenth embodiment.

Next, a description will be given of a nineteenth embodiment. FIG. 31 is a diagram showing a functional structure of the information searching system of the nineteenth embodiment. In FIG. 31, those parts that are the same as those corresponding parts in FIG. 20 or FIG. 28 are designated by the same reference numerals, and a description thereof will be omitted.

In an information searching system $1s$ shown in FIG. 31, the user keyword managing part 70 shown in FIG. 28 is added with respect to the structure shown in FIG. 20, and the advertising content managing part 60 shown in FIG. 20 is added with respect to the structure shown in FIG. 28.

In FIG. 31, the advertising content managing part 60 acquires the user keyword from the user keyword managing part 70 (a30), and selects the advertising content corresponding to the acquired user keyword. Hence, the document UI part 10 displays the advertising content corresponding to the user keyword. As a result, it is possible to display, together with the search result list, the advertising content that has a closer relationship or a higher association with the user.

Next, a description will be given of a twentieth embodiment. FIG. 32 is a diagram showing a functional structure of the information searching system of the twentieth embodiment. In FIG. 32, those parts that are the same as those corresponding parts in FIG. 31 are designated by the same reference numerals, and a description thereof will be omitted.

In an information searching system $1t$ shown in FIG. 32, the advertising content managing part 60 receives, as the input information, an arbitrary combination of the reading document index acquired from the index file part 40 (a18), the user keyword acquired from the user keyword managing part 40 (a30), the auxiliary keyword acquired from the auxiliary keyword generating part 30 (a16), and the search keyword acquired from the document UI part 10 (a17), and selects the advertising content corresponding to the input information. Hence, the document UI part 10 displays the advertising content corresponding to the input information. As a result, it is possible to display, together with the search result list, the advertising content having a close relationship or a high association with both the reading document 11 and the user.

In each of the embodiments described above, the auxiliary keyword generating part 30 includes a selecting part or means, an index information acquiring part or means, a search control part or means, and a character string extracting part or means. In addition, the advertising content managing part 60 includes an advertising content searching part of means. Moreover, the user keyword managing part 70 includes a user keyword storing part or means. Furthermore, the Web server 531 includes a document managing apparatus. The search server 521 includes a searching apparatus. The user PC 511 includes a client apparatus.

This application claims the benefit of Japanese Patent Applications No. 2006-63229 filed Mar. 8, 2006 and No. 2007-23431 filed Feb. 1, 2007, in the Japanese Patent Office, the disclosures of which are hereby incorporated by reference.

Further, the present invention is not limited to these embodiments, but various variations and modifications may be made without departing from the scope of the present invention.

What is claimed is:

1. An information searching method to be implemented in a computer, comprising:

a selection accepting procedure accepting a first character string from characters or a character string in a reading or inspecting document that is displayed on a display unit;

an index information acquiring procedure acquiring a second character string to be used as index information for searching the reading or inspecting document, based on identification information of the reading or inspecting document, and deleting the second character string that overlaps with the first character string from the index information; and a search control procedure executing a search using the first character string and the second character string as search keywords, wherein the index information acquiring procedure extracts each word having an occurrence that is greater than a predetermined value from the index information as the second character string, and wherein:

the index information acquiring procedure extracts at least one of the words having a co-occurrence that is greater than the predetermined value with respect to the first character string from a plurality of second character strings based on a co-occurrence management table that manages the co-occurrence for each combination of words in the index information as a third character string, and the search control procedure executes the search based on the first character string and the third character string.

2. The information searching method as claimed in claim 1, wherein the index information is formed by characters or a character string describing a feature of the reading or inspecting document.

3. The information searching method as claimed in claim 1, comprising:
an advertising content searching procedure searching an advertising content based on at least one of the second and the third character strings,
wherein the advertising content is displayed together with a search result of the searching procedure.

4. The information searching method as claimed in claim 1, comprising:
a storing procedure storing the second character strings acquired by the index information acquiring procedure or the third character strings extracted by the extracting procedure; and
a search procedure searching an advertising content based on the second or third character string that is related to a user who selected the first character string in the selection accepting procedure,
wherein the advertising content is displayed together with a search result of the searching procedure.

5. The information acquiring apparatus comprising:
a display part configured to display an electronic document;
a selection accepting part configured to accept a first character string from characters or a character string in a reading or inspecting document that is displayed on the display part;
an index information acquiring part configured to acquire a second character string to be used as index information for searching the reading or inspecting document, based on identification information of the reading or inspecting document, and to delete the second character string that overlaps with the first character string from the index information; and a search control part configured to execute a search using the first character string and the second character string as search keywords, wherein the index information acquiring part extracts each word having an occurrence that is greater than a predetermined value with respect to the first character string from the index information as the second character string, and wherein:

the index information acquiring part extracts at least one of the words having a co-occurrence that is greater than the predetermined value with respect to the first character string from a plurality of second character strings based on a co-occurrence management table that manages the co-occurrence for each combination of words in the index information as a third character string, and the search control part executes the search based on the first character string and the third character string.

6. The information acquiring apparatus as claimed in claim 5, wherein the index information is formed by characters or a character string describing a feature of the reading or inspecting document.

7. The information acquiring apparatus as claimed in claim 5, comprising:
an advertising content searching part configured to search an advertising content based on at least one of the second and the third character strings,
wherein the advertising content is displayed together with a search result the searching part.

8. An information acquiring apparatus as claimed in claim 5, comprising:
a storing part configured to store the second character strings acquired by the index information acquiring part or the third character strings extracted by the extracting part; and
a search part configured to search an advertising content based on the second or third character string that is related to a user who selected the first character string in the selection accepting part,
wherein the advertising content is displayed together with a search result of the searching part.

9. The information acquiring apparatus as claimed in claim 5, wherein the index information acquiring part acquires the index information from a search site on a Web or other Web sites.

10. The information acquiring apparatus as claimed in claim 5, wherein the index information acquiring part acquires the index information from a search site on a Web or other Web sites or, the information searching apparatus or, an apparatus that is coupled to the information searching apparatus via an Intranet.

11. An computer system comprising a document managing apparatus configured to manage a set of electronic documents and a client apparatus configured to display the electronic document, wherein the client apparatus comprises:
a computer processor comprising:
a selection accepting part configured to accept a first character string from characters or a character string in a reading or inspecting document that is displayed;
an index information acquiring part configured to acquire a second character string to be used as index information for searching the reading or inspecting document, based on identification information of the reading or inspecting document, and to delete the second character string that overlaps with the first character string from the index information; and a search control part configured to request the document managing apparatus to execute a search based on the first character string and the second character string as search keywords, wherein the index information acquiring part extracts each word having an occurrence that is greater than a predetermined value from the index information as the second character string, and wherein:

the index information acquiring part extracts at least one of the words having a co-occurrence that is greater than the predetermined value with respect to the first character string from a plurality of second character strings based on a co-occurrence management table that manages the co-occurrence for each combination of words in the index information as a third character string, and the search control part executes the search based on the first character string and the third character string.

12. The computer system as claimed in claim 11, wherein the document managing apparatus is located in a Web site on a Web or, on an Intranet to which the client apparatus is coupled or, both in the Web site and on the Intranet.

13. An computer system comprising a document managing apparatus configured to manage a set of electronic documents, a search apparatus configured to execute a search with respect to the set of electronic documents, and a client apparatus configured to display the electronic document, wherein the client apparatus comprises:

a computer processor comprising:

a selection acquiring part configured to acquire a first character string from characters or a character string in a reading or inspecting document that is displayed;

an index information acquiring part configured to acquire a second character string to be used as index information for searching the reading or inspecting document, based on identification information of the reading or inspecting document, and to delete the second character string that overlaps with the first character string from the index information; and a search control part configured to request the search apparatus to execute a search using the first character string and the second character string as search keywords, wherein the index information acquiring part extracts each word having an occurrence that is greater than a predetermined value with respect to the first character string from the index information as the second character string, and wherein:

the index information acquiring part extracts at least one of the words having a co-occurrence that is greater than the predetermined value with respect to the first character string from a plurality of second character strings based on a co-occurrence management table that manages the co-occurrence for each combination of words in the index information as a third character string, and the search control part executes the search based on the first character string and the third character string.

14. The computer system as claimed in claim 13, wherein the search apparatus is located in a Web site on a Web or, on an Intranet to which the client apparatus is coupled or, both in the Web site and on the Intranet.

* * * * *